(12) United States Patent
Hasegawa et al.

(10) Patent No.: US 6,510,379 B1
(45) Date of Patent: *Jan. 21, 2003

(54) METHOD AND APPARATUS FOR AUTOMATICALLY GENERATING PEDESTRIAN ROUTE GUIDE TEXT AND RECORDING MEDIUM

(75) Inventors: Tamotsu Hasegawa, Tokyo (JP); Hiroshi Sugiyama, Kawasaki (JP); Miwako Doi, Kawasaki (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/716,303

(22) Filed: Nov. 21, 2000

(30) Foreign Application Priority Data

Nov. 22, 1999 (JP) .......................................... 11-332113
May 24, 2000 (JP) ....................................... 2000-153509

(51) Int. Cl.⁷ .............................................. G01C 21/26
(52) U.S. Cl. ........................ 701/202; 701/200; 701/207; 701/208; 701/211; 701/212; 701/209; 340/988; 340/990
(58) Field of Search .......................... 701/23, 25, 200, 701/206, 201, 202, 207, 208, 209, 211, 212, 213, 214; 340/988, 990, 995; 73/178 R

(56) References Cited

U.S. PATENT DOCUMENTS 5,470,233 A * 11/1995 Fruchterman et al. ....... 434/112
6,208,934 B1 * 3/2001 Bechtolsheim et al. ...... 701/209
6,339,746 B1 * 1/2002 Sugiyama et al. .......... 701/209

OTHER PUBLICATIONS

Tamotsu Hasegawa, et al., "A Method of Generating A Route–Guide Text for Pedestrian," A Proceedings of the 60ᵗʰ Conference of IPSJ, 3Q–1, 2000, pp. 225–226.

Kensaku Fujii, et al., "A Method of Generating A Spot–Guidance for Human Navigation," The Transaction of IEICE, vol. J82–D–11, No. 11, Nov. 1999, pp. 2026–2035.

Satohide Tanigawa, et al., "User Friendly Route Guidance Interface for Internet–Based Information Service," vol. 55, No. 10, 2000, pp. 24–28.

* cited by examiner

Primary Examiner—Gertrude Arthur
(74) Attorney, Agent, or Firm—Oblon, Spivak, McClelland, Maier & Neustadt, P.C.

(57) ABSTRACT

A pedestrian route guide apparatus includes an input section which inputs a departure place and destination, a route data storage section for storing route data, a landmark storage section which stores a landmark, a route computation section which computes a route from the departure place to the destination on the basis of route data, a route editing section which edits the route, a landmark selector section which selects a landmark at each point on the route on the basis of the route obtained by the route editing section, a route guide text generator section which generates a route guide text on the basis of the route obtained by the route editing section and the landmark information selected by the landmark selector section, and a route text output section which presents the route guide text.

23 Claims, 23 Drawing Sheets

```
┌─────────────────────────────────────────────────┐
│     INPUT DEPARTURE PLACE AND DESTINATION       │
│     FOR ROUTE GUIDANCE                          │
│ ─────────────────────────────────────────────── │
│ DEPARTURE PLACE                                 │
│                           ┌──────────────────┐  │
│ STATION NAME, LANDMARK NAME│                  │  │
│                           └──────────────────┘  │
│                           ┌──────────────────┐  │
│        ADDRESS            │                  │  │
│                           └──────────────────┘  │
│ ─────────────────────────────────────────────── │
│ DESTINATION                                     │
│                           ┌──────────────────┐  │
│ STATION NAME, LANDMARK NAME│                  │  │
│                           └──────────────────┘  │
│                           ┌──────────────────┐  │
│        ADDRESS            │                  │  │
│                           └──────────────────┘  │
│                                                 │
│                         ┌──────┐  ┌────────┐    │
│                         │  OK  │  │ CANCEL │    │
│                         └──────┘  └────────┘    │
└─────────────────────────────────────────────────┘
```

FIG. 3

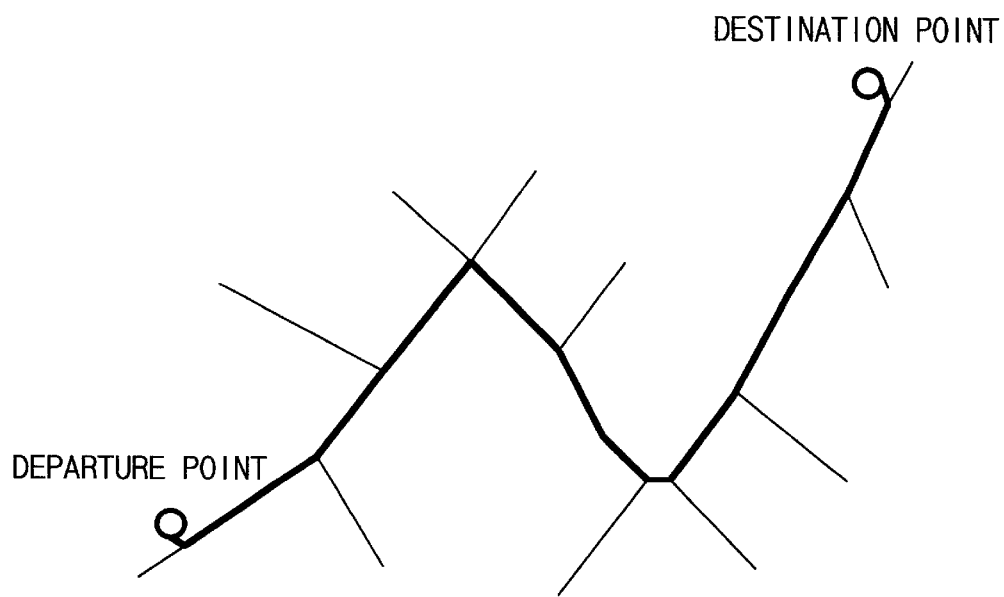

FIG. 4

(a) STRUCTURE OF NODE

| | |
|---|---|
| NODE ID | NUMERICAL VALUE |
| POSITION | (X, Y) |
| CROSSING NAME | CHARACTER STRING |
| NUMBER OF ARCS CONNECTED | NUMERICAL VALUE |
| ARRAY OF ARC IDS CONNECTED | ARRAY OF NUMERICAL VALUES |
| DEPARTURE POINT FLAG | NUMERICAL VALUE |
| DESTINATION POINT FLAG | NUMERICAL VALUE |

(b) STRUCTURE OF ARC

| | |
|---|---|
| ARC ID | NUMERICAL VALUE |
| POSITION OF START POINT | (X0, Y0) |
| POSITION OF END POINT | (X1, Y1) |
| START-POINT PORTION NODE ID | NUMERICAL VALUE |
| END-POINT PORTION NODE ID | NUMERICAL VALUE |
| ROAD NAME | CHARACTER STRING |
| ROAD WIDTH | NUMERICAL VALUE |
| END-POINT LEFT-SIDE LANDMARK ID | NUMERICAL VALUE |
| END-POINT RIGHT-SIDE LANDMARK ID | NUMERICAL VALUE |
| END-POINT LEFT-SIDE LANDMARK ANGLE | NUMERICAL VALUE |
| END-POINT RIGHT-SIDE LANDMARK ANGLE | NUMERICAL VALUE |

FIG. 5

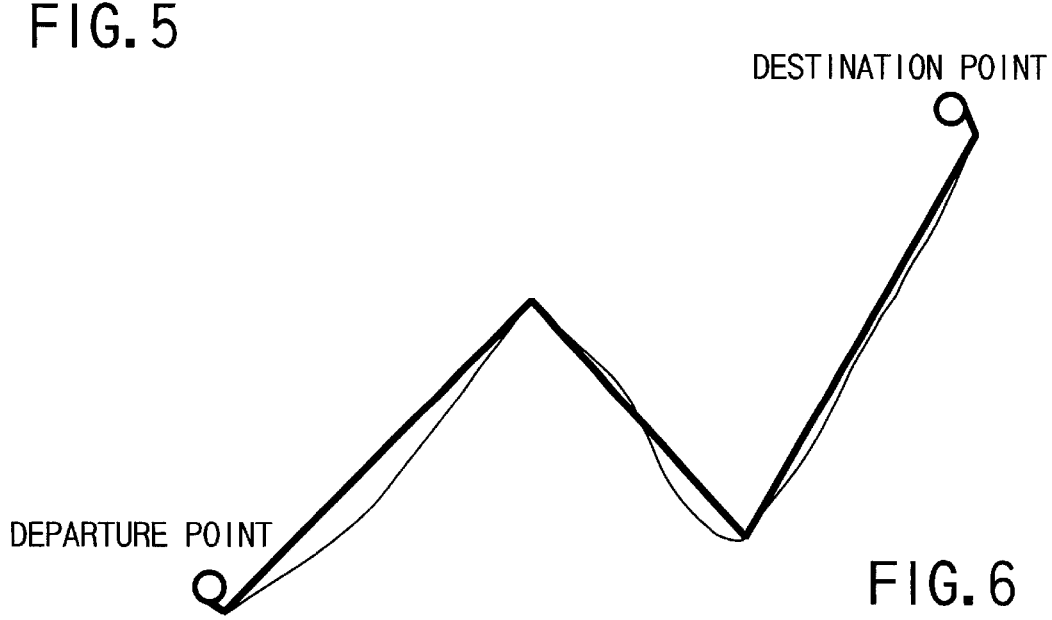

FIG. 6

(a) STRUCTURE OF LANDMARK DATA

| | |
|---|---|
| LANDMARK ID | NUMERICAL VALUE |
| NAME | CHARACTER STRING |
| TYPE | NUMERICAL VALUE DEFINED IN ADVANCE |
| PRIORITY | NUMERICAL VALUE |
| SHAPE EXPRESSION | CHARACTER STRING |
| POSITION | (X, Y) |

(b) EXAMPLE OF DEFAULT VALUES OF PRIORITIES

| TYPE | PRIORITY |
|---|---|
| * * * * * * * * * * * * * * * * * * * | |
| SUPERMARKET, CONVENIENCE STORE | 1 |
| BANK | 1 |
| POLICE BOX | 2 |
| GAS STATION | 2 |
| BOOKSTORE | 2 |
| RESTAURANT | 3 |
| SCHOOL | 3 |
| …… | …… |

(c) EXAMPLE OF DEFAULT VALUES OF SHAPE EXPRESSIONS

| TYPE | PRIORITY |
|---|---|
| * * * * * * * * * * * * * * * * * * * * * | |
| SUPERMARKET, CONVENIENCE STORE | (NO SETTING) |
| BANK | (NO SETTING) |
| HIGH-RISE BUILDING | 「LARGE BUILDING」 |
| HIGH-RISE CONDOMINIUM | 「LARGE CONDOMINIUM」 |
| GREEN AREA, PARK | 「PARK」 |
| …… | …… |

FIG. 7

(8-1) EXAMPLE OF STANDARD ROUTE GUIDE TEXT

▽TURN RIGHT AT (1-CHOME CROSSING) 100 m AHEAD WHERE [ATM OF MAICHO BANK] IS LOCATED ON RIGHT SIDE AND [GROCERY STORE WITH BLUE ROOF] IS LOCATED ON LEFT SIDE, AND GO AHEAD 50 m.
▽TURN LEFT AT CORNER WHERE [JOUGE BOOKSTORE] IS LOCATED ON RIGHT SIDE AND [12-STORY BUILDING] IS LOCATED ON LEFT SIDE, AND GO AHEAD 200 m ALONG <CHUO STREET>.
☆TURN LEFT, AND YOU WILL FIND DESTINATION.

(8-2) EXAMPLE USING EXPRESSION "ALONG ROAD"

▽TURN RIGHT AT (1-CHOME CROSSING) 100 M AHEAD WHERE [ATM OF MAICHO BANK] IS LOCATED ON RIGHT SIDE AND [GROCERY STORE WITH BLUE ROOF] IS LOCATED ON LEFT SIDE, AND GO AHEAD 50 m.

▽GO AHEAD 200 m ALONG ROAD AT CORNER WHERE [JOUGE BOOKSTORE] IS LOCATED ON RIGHT SIDE AND [12-STORY BUILDING] IS LOCATED ON LEFT SIDE.
▽GO AHEAD 150 m ALONG ROAD AT CORNER WHERE [SUZUKI STORE] IS LOCATED ON RIGHT SIDE AND [SATO DENTAL CLINIC] IS LOCATED ON LEFT SIDE.

☆TURN RIGHT, AND YOU WILL FIND DESTINATION.

USING EXPRESSION "ALONG ROAD"

(8-3) EXAMPLE OF SEPARATING ROUTE GUIDE TEXT CORRESPONDING TO STRAIGHT PORTION IN ACCORDANCE WITH PREDETERMINED LENGTH

▽TURN LEFT AT (1-CHOME CROSSING) 100 m AHEAD WHERE [ATM OF MAICHO BANK] IS LOCATED ON RIGHT SIDE AND [GROCERY STORE WITH BLUE ROOF] IS LOCATED ON LEFT SIDE, AND GO AHEAD 100 m.

▽GO AHEAD 200 m THROUGH PLACE WHERE [5-STORY APARTMENT] IS LOCATED ON RIGHT SIDE AND [CONVENIENCE STORE ABC] IS LOCATED ON LEFT SIDE.
▽GO AHEAD 100 m THROUGH PLACE WHERE [STATIONARY SHOP] WITH YELLOW ROOF IS LOCATED ON RIGHT SIDE AND [100-YEN SHOP] IS LOCATED ON LEFT SIDE.

☆TURN LEFT, AND YOU WILL FIND DESTINATION.

FIG. 8   ROUTE GUIDE TEXT CORRESPONDING TO STRAIGHT PORTION IS SEPARATED (8-4) EXAMPLE OF EXPRESSING DISTANCE IN NECESSARY TIME

▽ TURN LEFT AT (1-CHOME CROSSING) 100 m AHEAD WHERE [ATM OF MAICHO BANK] IS LOCATED ON RIGHT SIDE AND [GROCERY STORE WITH BLUE ROOF] IS LOCATED ON LEFT SIDE, AND GO AHEAD FOR 2 MINUTES ON FOOT.
▽ GO AHEAD FOR 2 MINUTES ON FOOT THROUGH PLACE WHERE [5-STORY APARTMENT] IS LOCATED ON RIGHT SIDE AND [CONVENIENCE STORE ABC] IS LOCATED ON LEFT SIDE.
▽ GO AHEAD FOR 1-MINUTE ON FOOT THROUGH PLACE WHERE [STATIONARY SHOP WITH YELLOW ROOF] IS LOCATED ON RIGHT SIDE AND [100-YEN SHOP] IS LOCATED ON LEFT SIDE.
☆ TURN LEFT, AND YOU WILL FIND DESTINATION.

(8-5) EXAMPLE OF EXPRESSING DISTANCE IN NUMBER OF STEPS

▽ TURN LEFT AT (1-CHOME CROSSING) 100 m AHEAD WHERE [ATM OF MAICHO BANK] IS LOCATED ON RIGHT SIDE AND [GROCERY STORE WITH BLUE ROOF] IS LOCATED ON LEFT SIDE, AND GO AHEAD 300 STEPS.
▽ GO AHEAD 300 STEPS THROUGH PLACE WHERE [5-STORY APARTMENT] IS LOCATED ON RIGHT SIDE AND [CONVENIENCE STORE ABC] IS LOCATED ON LEFT SIDE.
▽ GO AHEAD 150 STEPS THROUGH PLACE WHERE [STATIONARY SHOP WITH YELLOW ROOF] IS LOCATED ON RIGHT SIDE AND [100-YEN SHOP] IS LOCATED ON LEFT SIDE.
☆ TURN LEFT, AND YOU WILL FIND DESTINATION.

(8-6) EXAMPLE OF USING ICONS REPRESENTING LANDMARKS

▽ TURN RIGHT AT (3-CHOME CROSSING) 50 m AHEAD WHERE [🍴] [RESTAURANT CHUKATENSHIN] IS LOCATED ON RIGHT SIDE AND [〒] [OMACHI DAISAN POST OFFICE] IS LOCATED ON RIGHT SIDE, AND GO AHEAD 100 m.
▽ TURN LEFT AT CORNER WHERE [☕] [COFFEE SHOP SUZUKI] IS LOCATED ON RIGHT SIDE AND [🚲] [ITO BICYCLE] IS LOCATED ON LEFT SIDE, AND GO AHEAD 50 m.
☆ TURN RIGHT, AND YOU WILL FIND DESTINATION.

FIG. 9

| | |
|---|---|
| LANDMARK COUNT | NUMERICAL VALUE |
| LANDMARK 1 | NUMERICAL VALUE |
| LANDMARK 2 | NUMERICAL VALUE |
| LANDMARK 3 | NUMERICAL VALUE |
| ............ | ............ |
| LANDMARK N | NUMERICAL VALUE |

▽TURN RIGHT AT (1-CHOME CROSSING) 100 m AHEAD WHERE [MAICHO BANK] IS LOCATED ON RIGHT SIDE AND [DAIICHI STORE] IS LOCATED ON LEFT SIDE, AND GO AHEAD 50 m.

▽TURN LEFT AT CORNER WHERE [JOUGE BOOKSTORE] IS LOCATED ON RIGHT SIDE AND 12-STORY BUILDING IS LOCATED ON LEFT SIDE, AND GO AHEAD 200 m ALONG] <CHUO STREET>.

☆TURN LEFT, AND YOU WILL FIND DESTINATION.

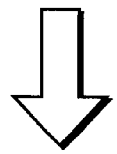

▽TURN RIGHT AT (1-CHOME CROSSING) 100 m AHEAD WHERE [MAICHO BANK] IS LOCATED ON RIGHT SIDE AND [DAIICHI STORE] IS LOCATED ON LEFT SIDE, AND GO AHEAD 50 m.

▽TURN LEFT AT CORNER WHERE [JOUGE BOOKSTORE]

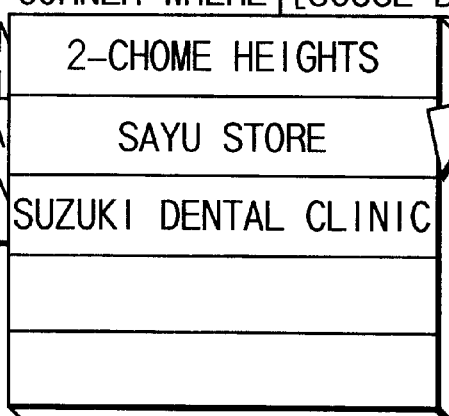

FIG. 17

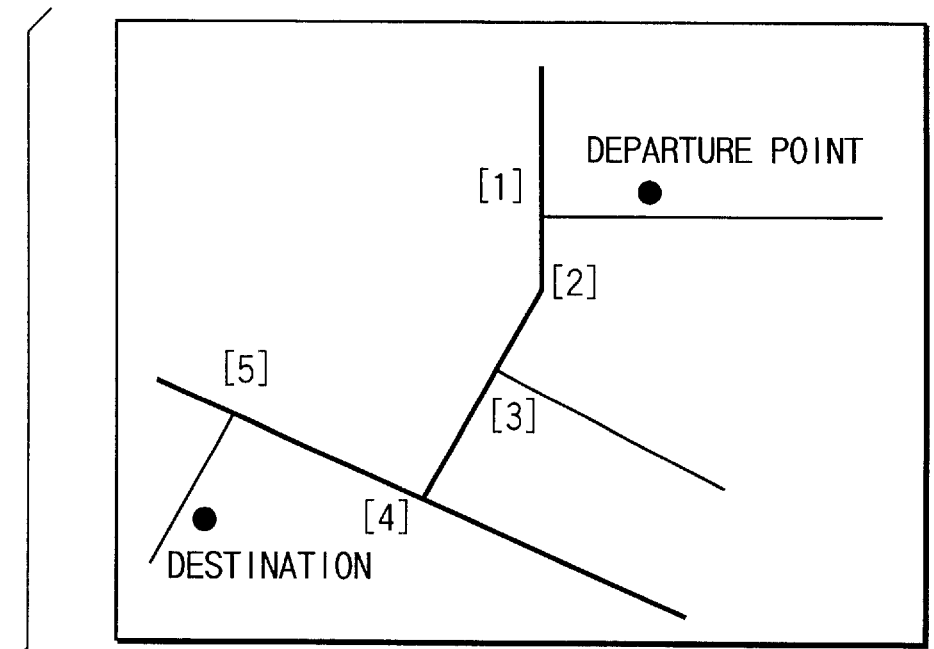

▽TURN LEFT AT PLACE 30 m AHEAD WHERE [MAICHO BANK] IS LOCATED ON LEFT SIDE AND [ [1] YAMASHITA STORE] IS LOCATED ON RIGHT SIDE, AND GO AHEAD 20 m

▽TURN RIGHT AT PLACE WHERE [ [2] OZORA BOOKSTORE] IS LOCATED ON LEFT SIDE, AND GO AHEAD 30 m

▽GO AHEAD 40 m THROUGH PLACE WHERE [ [3] SUZUKI STORE] IS LOCATED ON LEFT SIDE

▽TURN RIGHT AT (1-CHOME CROSSING) WHERE [ [4] DAIICHI SUPERMARKET] IS LOCATED ON RIGHT SIDE, AND GO AHEAD 60 m

▽TURN LEFT AT PLACE WHERE [TAKAHASHI STORE] IS LOCATED ON LEFT SIDE AND [ [5] YAMAMOTO LIQUOR SHOP] IS LOCATED ON RIGHT SIDE, AND GO AHEAD 30 m

☆YOU WILL FIND DESTINATION ON RIGHT SIDE

FIG. 21

METHOD AND APPARATUS FOR AUTOMATICALLY GENERATING PEDESTRIAN ROUTE GUIDE TEXT AND RECORDING MEDIUM

CROSS-REFERENCE TO RELATED APPLICATIONS

This application is based upon and claims the benefit of priority from the prior Japanese Patent Applications No. 11-332113, filed Nov. 22, 1999, and No. 2000-153509, filed May 24, 2000, the entire contents of which are incorporated herein by reference.

BACKGROUND OF THE INVENTION

The present invention relates to an information provider system for pedestrian which shows a user a pedestrian route from an input departure place to an input destination and, more particularly, to an apparatus for automatically generating pedestrian route guide texts.

As portable route guidance systems for pedestrians, systems for displaying maps on the screens of terminals are available. Many of these systems allow users to freely scroll maps and walk to destinations while seeing the maps. Recently, apparatuses for automatically displaying map around the current positions by obtaining the current positions by using position information services provided through GPSs and PHSs have been commercially available.

Because of the use of image information, i.e., maps, however, it is difficult to use such systems in apparatuses having small screens, such as portable telephones and PHSs which have recently become very popular.

In many cases, users want to refer to route guide information while they are walking, and hence demands have arisen for the provision of information by voice in consideration of the safety of pedestrians. From this point of view, there are strong demands for conversion of route guide information into a language and texts. To convert route guide information into a language, a route must be searched out on the basis of general road network data issued by a map company and the like.

In these data, however, line segments of components different from actual roads, which are often present in portions where the road width is large and includes the entrances and exits of center traffic strips and elevated roads, are often included in searched routes. These line segments do not pose any serious problem in generating a simplified map for route guidance. In generating a route guide text on the basis of this route, however, such route information needs to be geometrically shaped. This editing processing leads to simplification of the route and a text to be generated. However, there has been no system which is designed to generate a route guide text by such editing processing.

As a technique of converting map information into a language, which has already been commercialized, a voice guidance function in a car navigation system is available. Many of such guidance data are formed on the basis of road names and crossing names, and hence are not suitable for guidance for pedestrians. Guidance for a pedestrian is preferably made on the basis of target objects such as buildings near these roads and crossings, i.e., landmark information. Several systems using such a technique have been proposed. Each of these systems presents landmark information by directly using landmark names. In practice, some buildings as target objects allow a pedestrian to specify their names as the pedestrian walks near the buildings, but other target objects allow the pedestrian to recognize only their types. For this reason, a method of expressing a landmark needs to be switched to an appropriate one in accordance with the type of landmark. However, such a system has not existed.

In addition, since landmark information changes day by day, information held by a system may differ from actual information. For example, some buildings may be demolished and the names of some stores may be changed. Furthermore, the surroundings of a given target object may change to make the object less noticeable. As a consequence, the object may become inadequate as a landmark. However, no conventional system can display another landmark located near such a landmark.

Pedestrian route guidance systems are strongly required to convert a route guide map into a language, i.e., generate a route guide text. In obtaining a route as a base for route guidance, however, the route is affected by line segments of components different from an actual road on a road network. For this reason, editing must be performed to remove these line segments from the obtained route. However, such a system has not existed.

There are also demands for a system designed to automatically switch expression methods in accordance with the types of landmarks to be presented. However, such a system has not existed. In some case, changes in landmarks themselves or surroundings make landmarks prepared by a system useless as guides. In consideration of such a case, a system that allows a user to freely call other landmarks is required. However, such a system has not existed.

BRIEF SUMMARY OF THE INVENTION

It is an object of the present invention to provide an apparatus for automatically generating a pedestrian route guide text, which generates an accurate, simple route guide text without any influences of short line segments on a road network.

It is another object of the present invention to provide an apparatus for automatically generating a pedestrian route guide text, which generate a route guide text easy to understand for a pedestrian by switching expressions in accordance with landmarks.

It is still another object of the present invention to provide an apparatus for automatically generating a pedestrian route guide text, which can flexibly cope with changes in surroundings, e.g., a failure to find a landmark as a guide.

According to the present invention, there is provided an apparatus for automatically generating a pedestrian route guide text, comprising an input section which inputs a departure place and destination, a route data generator section which outputs route data, a landmark information generator section which outputs a landmark serving as a guide for a pedestrian and information associated with an expression form of the landmark, a route computation section which computes a route from the departure place to the destination, which are input through the input section, on the basis of route data obtained from the route data generator section, a route editing section which edits the route to remove a noise element that causes a guidance error from the route obtained by the route computation section, a landmark selector section which selects a landmark at each point on the route on the basis of the route obtained by the route editing section, a route guide text generator section which generates a route guide text on the basis of the route obtained by the route editing section and landmark information selected by the landmark selector section, and a route text output section which presents the route guide text generated by the route guide text generator section.

According to the present invention, the landmark selector section extracts a landmark within a predetermined distance range, and the route text output section, if a plurality of landmarks are extracted, presents at least one of the extracted landmarks.

According to the present invention, the route text output section presents the route guide text by using at least one of presentation using a landmark name and presentation using an expression representing a characteristic feature.

According to the present invention, if a straight path on a route exceeds a predetermined length, landmark information is selected midway along the straight path.

According to the present invention, the route guide text generator section generates a guide text by expressing a distance from a given point to a next point on a route using at least one of expressions of an absolute distance, a necessary time, and the number of necessary steps.

According to the present invention, the route guide text generator section expresses a distance or walking direction from a given point to a next point on a route upon rounding off within a range in which a pedestrian is not misled.

According to the present invention, the route guide text generator section emphasizes and presents a landmark name.

According to the present invention, the route guide text generator section presents a type of landmark with an icon being attached thereto.

According to the present invention, the route guide text generator section can present a route guide text upon deleting a portion thereof which corresponds to a place where the pedestrian has already walked.

In addition, according to the present invention, there is provided a method of automatically generating a pedestrian route guide text, comprising the steps of setting a departure place and destination, preparing route data, a landmark serving as a guide for a pedestrian, and landmark information associated with an expression form of the landmark, computing a route from the set departure place to the set destination on the basis of the route data, editing the route to remove a noise element that causes a guidance error from the route obtained by the computation, selecting a landmark at each point on the route on the basis of the edited route, generating a route guide text on the basis of the edited route and selected landmark information, and presenting the generated route guide text.

Furthermore, according to the present invention, there is provided a recording medium storing a program for causing a computer to function as a destination setting section which sets a departure place and destination, a landmark selecting section which acquire route data, a landmark serving as a guide for a pedestrian, and landmark information associated with an expression form of the landmark, a computation section which computes a route from the departure place to the destination on the basis of the route data, an editing section which edits the route to remove a noise element that causes a guidance error from the route obtained by the computation, a selector section which selects a landmark at each point on the route on the basis of the edited route, a route guide text generator section which generates a route guide text on the basis of the edited route and selected landmark information, and a route text output section which presents the generated route guide text.

According to the present invention, the apparatus further comprises a landmark list storage section and sequentially manages the landmarks obtained by the landmark selector section in the form of a list structure, starting from the first candidate.

According to the present invention, by changing the item of landmark IDs of route data into that of landmark list IDs, second and third landmarks can be extracted, as well as the first candidate, by tracing the list.

In addition, according to the present invention, a system is implemented, which includes a section which edits a searched route to reduce the influences of short line segments (garbage) on a road network and generate a simple, easy-to-understand route guide text.

According to the present invention, a system is implemented, in which information indicating how landmark information is expressed is added to the landmark information, and even if such information is not given, an appropriate expression method is selected in accordance with a landmark by setting a default value corresponding to each type of landmark, thereby generating a route guide text which is easy for a pedestrian to understand.

Furthermore, according to the present invention, a system is implemented, in which for each landmark selected by the system, other nearby landmarks are linked to the selected ones so as to allow the user to freely call these landmarks afterward, thereby flexibly coping with changes in surroundings.

According to the present invention, there is provided an apparatus for automatically generating a pedestrian route guide text, comprising an input section which inputs a departure place and destination, a route data storage section which stores route data, a landmark storage section which stores a landmark serving as a guide and information associated with an expression form of the landmark, a route computation section which computes a route from the departure place to the destination, which are input through the input section, on the basis of route data stored in the route data storage section, a route editing section which edits the route to remove a noise element that causes a guidance error from the route obtained by the route computation section, a landmark selector section which selects a landmark at each point on the route on the basis of the route obtained by the route computation section and the route editing section, a simplified map display landmark selector section which selects a landmark to be displayed on a simplified map from the selected landmarks, a simplified map drawing section which generates a simplified map for the route on the basis of the route obtained by the route computation section and the landmark information selected by the simplified map display landmark selector section, a route guide text generator section which generates a route guide text on the basis of the route obtained by the route computation section and the route editing section and the landmark information selected by the landmark selector section and the simplified map display landmark selector section, and a route text output section which presents the route guide text generated by the route guide text generator section and the simplified map generated by the simplified map drawing section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a view showing an example of a route guide input window;

FIG. 4 is a view showing an example of a route that is searched out;

FIG. 5 is a view showing a node structure (a) and arc structure (b);

FIG. 6 is a view showing an example of an edited route;

FIG. 7 is a view showing the structure of landmark data;

FIG. 8 is a view showing display examples (8-1) to (8-3) of route guide texts;

FIG. 9 is a view showing display examples (8-4) to (8-6) of route guide texts;

FIG. 17 is a view showing a display example of other landmark candidates;

FIG. 21 is a view showing an example of how information is presented by the apparatus for automatically generating a pedestrian route guide text according to the third embodiment;

DETAILED DESCRIPTION OF THE INVENTION (First Embodiment)

Figure 1:
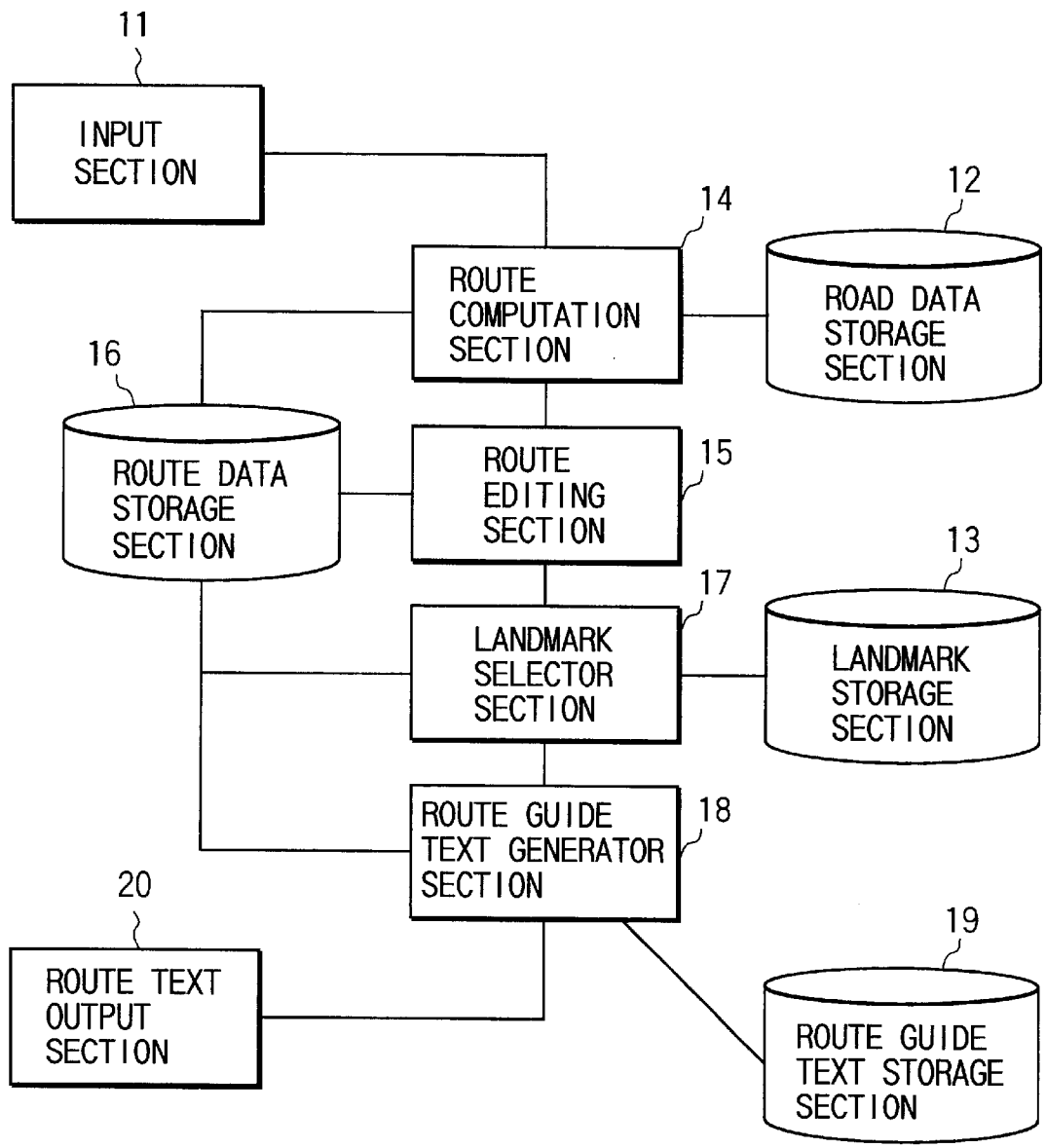
FIG. 1 is a block diagram showing the schematic arrangement of an apparatus for automatically generating a pedestrian route guide text according to the first embodiment.

FIG. 1 shows the schematic arrangement of the first embodiment. An apparatus for automatically generating pedestrian route guide texts according to this embodiment includes an input section 11 which designates a current point and destination, a route data storage section 12 which stores the network data of roads, and a landmark storage section 13 which stores landmark information as a landmark and information indicating how this landmark is expressed. A route computation section 14 computes a route from a departure place to a destination, which are input through the input section 11, on the basis of route data stored in the route data storage section 12. A route editing section 15 edits the route obtained by the route computation section 14 to remove unnecessary elements for route guidance from the route. A route data storage section 16 stores the route obtained by the route computation section 14 and route editing section 15. A landmark selector section 17 selects a landmark at each point on the route, and adds the selection result to the data in the route data storage section 16. A route guide text generator section 18 generates route guide texts for pedestrians on the basis of the route in the route data storage section 16 and a landmark expression scheme definition table. A route guide text storage section 19 stores the route guide text generated by the route guide text generator section 18. A route text output section 20 presents the route guide text in the route guide text storage section 19 to a user.

Figure 2:
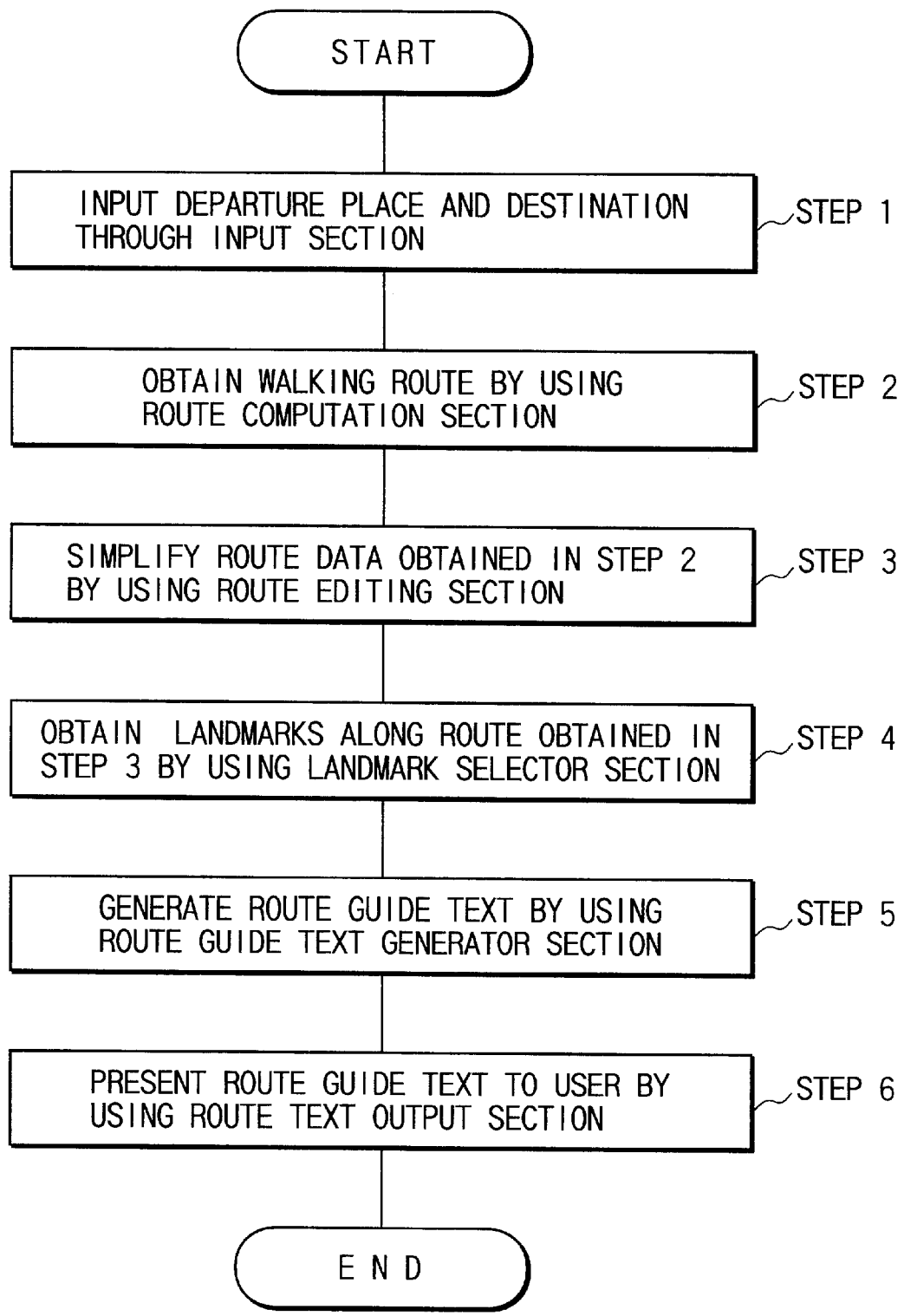
FIG. 2 is a flow chart showing a procedure for generating a route guide text.

FIG. 2 is a procedure for generating a route guide text in this embodiment. This apparatus starts its operation when the user calls the execution of route guidance. First of all, a departure place and destination are input through the input section 11 (step 1). For example, a window like the one shown in FIG. 3 is displayed to make the user input a departure place and destination. As a method of designating a departure place and destination, a scheme of inputting the name of a nearby station, landmark name, address, and telephone number or a scheme of displaying a map and inputting data with a pointing device can be used. As a departure place, for example, the current position may be automatically set as an initial value by using position information services provided by a GPS or PHS or a position correcting section using a combination of these services and a pedometer and accelerometer. Alternatively, a user's home or office or a station that the user uses in daily life can be registered as a departure place.

Subsequently, a pedestrian route is obtained (step 2). The route computation section 14 computes this route by using the road network data (route data) stored in the route data storage section 12 on the basis of the departure place and destination supplied from the input section 11. The obtained route is stored in the route data storage section 16.

As a method of computing a route, a method of preferentially selecting a route with a sidewalk for pedestrians may be used. In this case, however, for example, the Dijkstra method known as an algorithm for finding a shortest route is used to compute a route.

Assume that a route search is made by drawing perpendicular lines from a start point (departure point) and end point (destination point) to the nearest road line segments, and setting the intersections of the road line segments and the perpendicular lines as start and end points, respectively, and a route is generated by adding the above additional line segments to the search result. If given line segments are less than a predetermined length, i.e., a departure point and destination point can be considered to be located on roads without posing any problem, no line segment is added, and the start and end points on the roads are set as a departure point and destination point, respectively. The following processing is then executed.

As a route computation result, route data expressed by nodes and arcs between the departure place and the destination like those shown in FIG. 4 is obtained. Nodes and arcs include items like those shown in FIGS. 5A and 5B, respectively. Node IDs and arc IDs are keys for identifying the respective nodes and arcs, and are uniquely assigned to the respective nodes and arcs.

The route editing section 15 performs editing processing to remove noise line segments that become causes of guidance errors from the route data generated in step 2 and stored in the route data storage section 16 (step 3). Shaping processing is constituted by two processes, i.e., deleting short line segments and merging continuous line segments in the same direction (synthesizing process). The former process is a measure against a case wherein route data includes short line segments extending in directions different from those of actual roads at a crossing portion on a wide road, a center traffic strip and overpass on roads, and the like so as to maintain network continuity.

In addition, when a road network is automatically generated by recognition processing from a town map drawing, such line segments are often included in route data. The latter process is performed to merge line segments that indicate walking in the same direction so as to generate route guide texts in units of nodes, and to reduce the amount of route guide texts without greatly reducing the information amount. FIG. 6 shows a case wherein the route in FIG. 4 is edited. The route having undergone the editing processing is stored in the route data storage section 16 to replace the route obtained in step 2. Note that each procedure will be described later.

The landmark selector section 17 obtains landmarks along the route obtained in step 3 (step 4). Items like those (a) shown in FIG. 7 are stored in units of landmarks. "Landmark ID" is a key for identifying a landmark and uniquely assigned to each landmark. "Name" is the specific designation of a landmark and sufficient information for identifying the landmark in that place. "Type" is a name representing the type of landmark and sufficient information for roughly recognizing the landmark. "Priority" is a value representing how much the landmark is appropriate as a landmark for route guidance, and values (b) set in advance in correspondence with types in generating data as shown in FIG. 7 are set as initial values. "Shape expression" is a character string expressing the shape of the landmark, e.g., the character string "large white building", "school building with large ground", or "12-story condominium". "Position" is the position information of the landmark and designated by a longitude and latitude or the like. FIG. 7 shows default "shape expression" information (c) corresponding to each type of landmark. With regard to a landmark having no shape expression, this default expression is referred to and used in accordance with the type.

The landmark selector section 17 extracts landmarks located near the respective points on the route on the basis of the position information of landmark data, and selects optimal landmarks at the respective points from the extracted landmarks. The selected landmarks are added to the route data in the route data storage section 16. A method of selecting landmarks will be described in detail later.

The route guide text generator section 18 generates a route guide text on the basis of the route data generated so far in step 4 (step 5). The generated route guide text is stored in the route guide text storage section 19. A method of generating a route guide text will be described in detail later.

Lastly, the route text output section 20 presents the route guide text generated in the route guide text storage section 19 to the user (step 6). The procedure for generating a route guide text is completed in the above manner.

A method of presenting route guide texts by using the route text output section 20 will be described next. FIG. 8 shows examples of how route guide texts are displayed on a window display apparatus. In each example, the symbol "▽" attached to the head of each text indicates that another guide text follows. The symbol "☆" is attached to the head of the last text to indicate so. In addition, a road name is enclosed in the angle brackets "< >", a crossing name is enclosed in the parentheses "( )", and a building name is enclosed in the brackets "[ ]" to make them noticeable and make the types represented by the respective names recognizable. These symbols may be replaced with other symbols. In addition, for example, methods of changing fonts and colors can be used.

Referring to FIG. 8, "(8-1)" indicates an example of a standard route guide text. As shown in this example, at each crossing portion, left and right landmarks each are presented by using names or expressions indicating characteristics, e.g., shapes.

"(8-2)" indicates an example of a route guide text using the expression "along the road" when the angle at which the user makes a turn at a crossing is small.

"(8-3)" indicates an example of a route guide text which is separated in accordance with a predetermined length when a road portion where the user walks straight exceeds a given length. Each separated portion presents left and right landmarks like other crossing portions.

Referring to FIG. 9, "(8-4)" and "(8-5)" indicate examples using measurement systems other than the metric system in displaying distances. "(8-4)" indicates an example of displaying distances in required times. "(8-5)" indicates an example of displaying distances in the numbers of steps.

"(8-6)" indicates an example of displaying a route guide text with icons corresponding to the types of landmarks being added to the landmarks. Each icon may be positioned before a corresponding landmark name as shown in FIG. 9, or may be positioned after it.

The route text output section 20 may use synthetic voices as well as a window. As a method of emphasizing landmark portions, a method of outputting general text portions by male voice, and landmark portions by female voice, and vice versa. In the above manner, the route text output section 20 presents route guide texts.

Figure 10A:
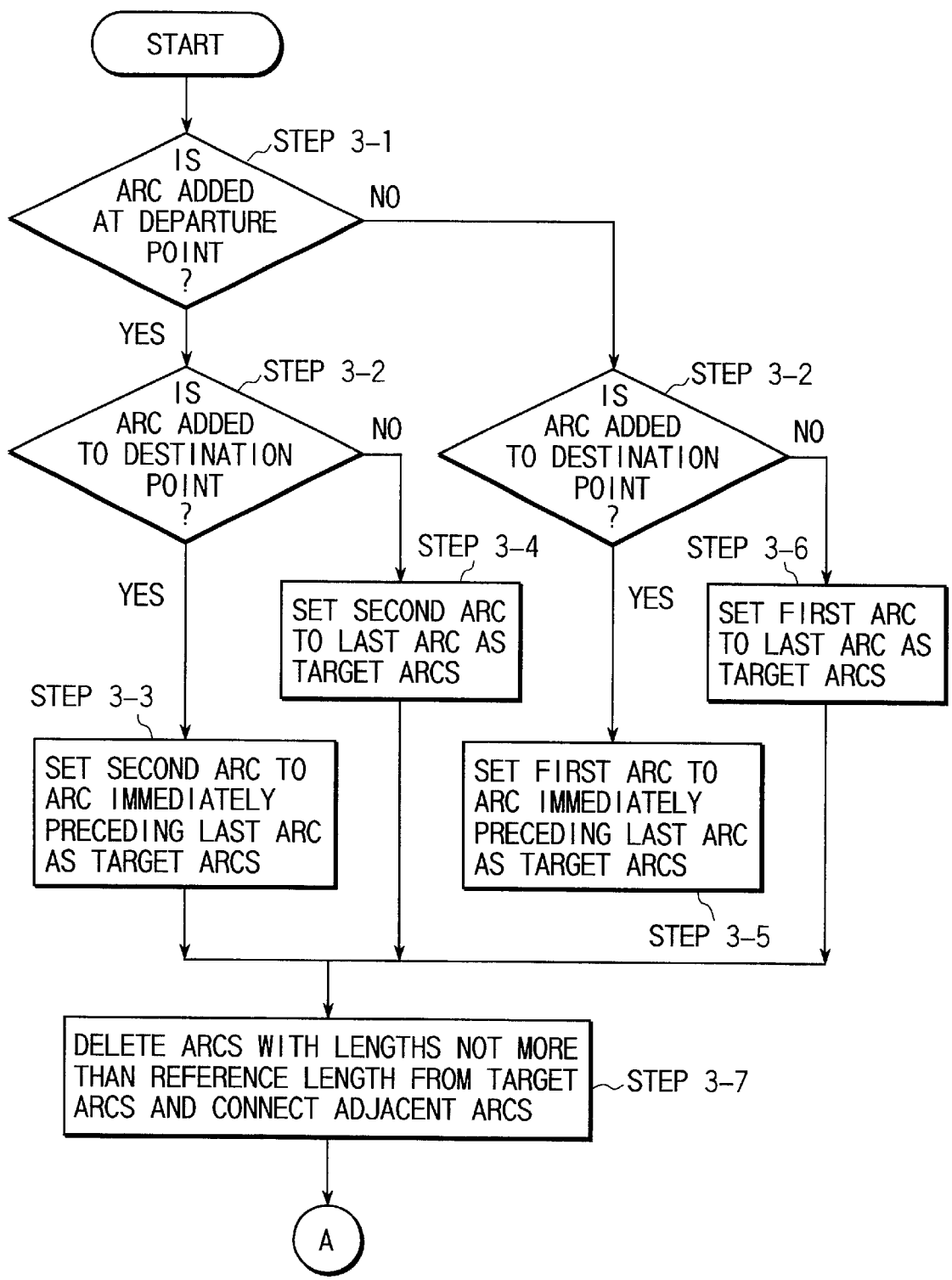
FIGS. 10A and 10B are flow charts showing a procedure for editing processing.
Figure 10B:
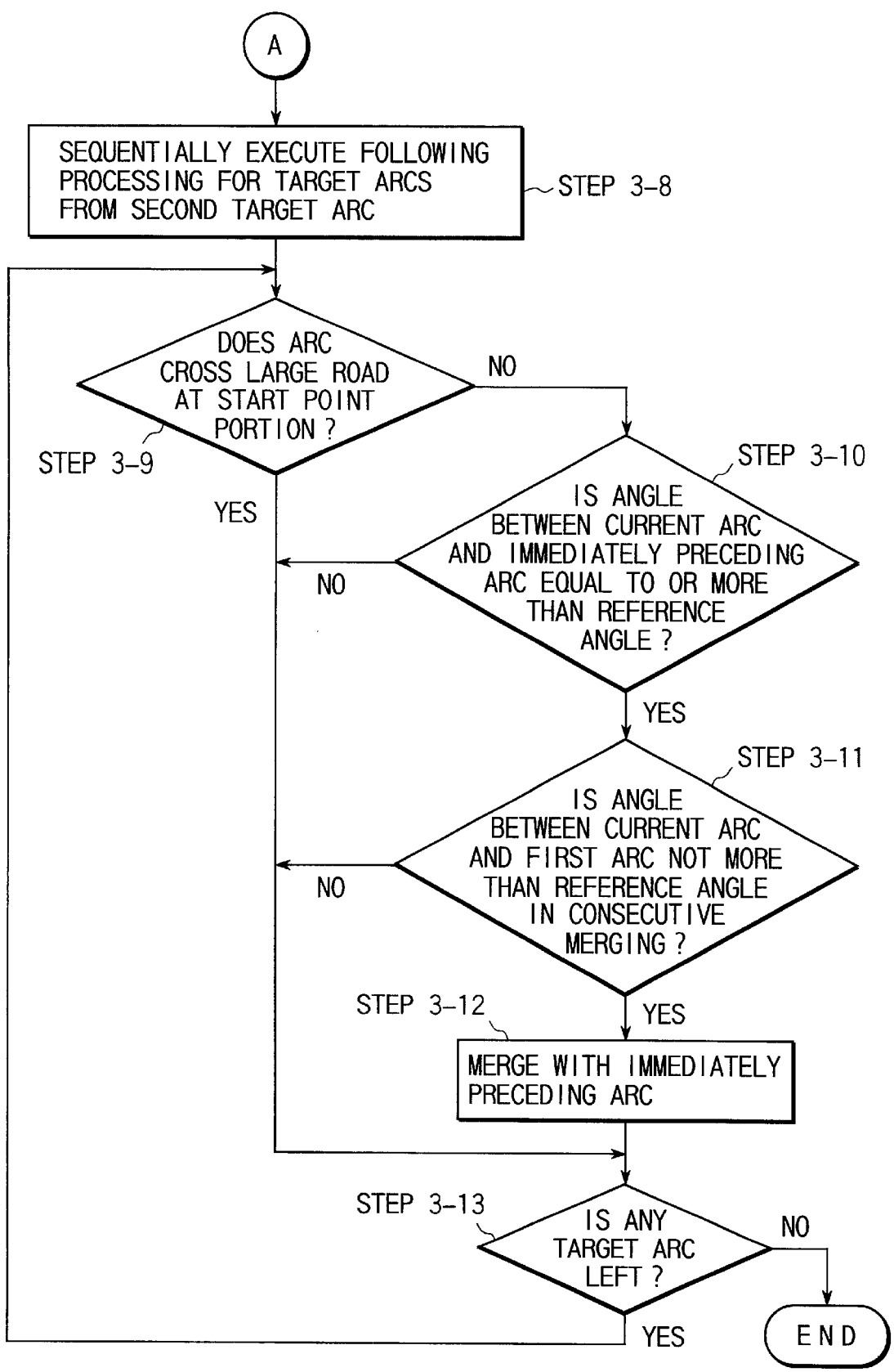

Editing processing (step 3) in the route editing section 15 will be described next. Shaping processing for route data is performed according to the procedure shown in FIGS. 10A and 10B. First of all, it is checked whether arcs are added at the departure point and destination point (steps 3-1 and 3-2). Target arcs to be edited are determined in accordance with this result. If arcs are added at the departure point and destination point, the second arc to one immediately preceding the last one are determined as target arcs (step 3-3). If an arc is added at the departure point but no arc is added at the destination point, the second arc to the last one are determined as target arcs (step 3-4). If no arc is added at the departure point but an arc is added at the destination point, the first arc to one immediately preceding the last one are determined as target arcs (step 3-5). If no arc is added at the departure point and destination point, the first arc to the last one are determined as target arcs (step 3-6).

Subsequently, short arcs are deleted from the target arcs obtained in steps 3-3 to 3-6, and adjacent arcs are connected to each other (step 3-7). A short arc is determined depending on whether it exceeds a predetermined reference length. The reference length may be fixed or variably take an appropriate value in accordance with surroundings. In the latter case, the reference length can be set to be relatively long in, for example, a place in front of a station or a main road where the road width is large, and short line segments in directions different from the actual route direction tend to occur. In contrast to this, the reference length can be set to be short in, for example, a residential area where the road width is small. Determination on surrounding can be made from the road with attributes of line segments located before and after the corresponding line segment. Alternatively, locations such as an urban area and residential area may be defined in advance so that surroundings can be determined from the location where the corresponding line segment is positioned.

Subsequently, after the deletion processing in step 3-7 is performed for the target arcs, the following processing is sequentially executed for the remaining arcs from the second target arc (step 3-8). The reason why the processing starts from the second arc is that computation processing is to be performed between the second arc and the immediately preceding arc in the following processing.

First of all, it is checked whether the start point portion of an arc crosses a large road (step 3-9). A given road is determined by checking whether the attribute indicating the type, which is assigned to the road, takes a value not less than a reference value. Alternatively, such determination may be performed from the attribute value of a road width. If the arc is contacting a large road, the flow advances to step 3-13. Otherwise, the flow advances to step 3-10.

In step 3-10, it is checked whether the angle between the current arc and the immediately preceding arc is not less than a reference angle. If the angle is not less than the reference angle, the flow advances to step 3-11. Otherwise, the flow advances to step 3-13.

In step 3-11, if arcs are continuously merged with each other, it is checked whether the angle between the current arc and the first arc that was merged is not less than a predetermined angle. If the angle is not more than the predetermined angle, the flow advances to step 3-12. If the angle exceeds the predetermined angle, the flow advances to step 3-13.

In step 3-12, the current arc and the immediately preceding arc are merged with each other. In this case, merging is performed such that the start and end points of the resultant arc respectively coincide with the start point of the immediately preceding and the end portion of the current arc.

It is then checked whether any target arc exists following the current arc (step 3-13). If there is a target arc, the processing in step 3-9 and the subsequent steps is repeated for the arc. If there is no target arc, the editing processing is terminated. In this manner, the route editing section 15 executes the editing processing.

Landmark selection processing (step 4) in the landmark selector section 17 will be described next.

Figure 11:
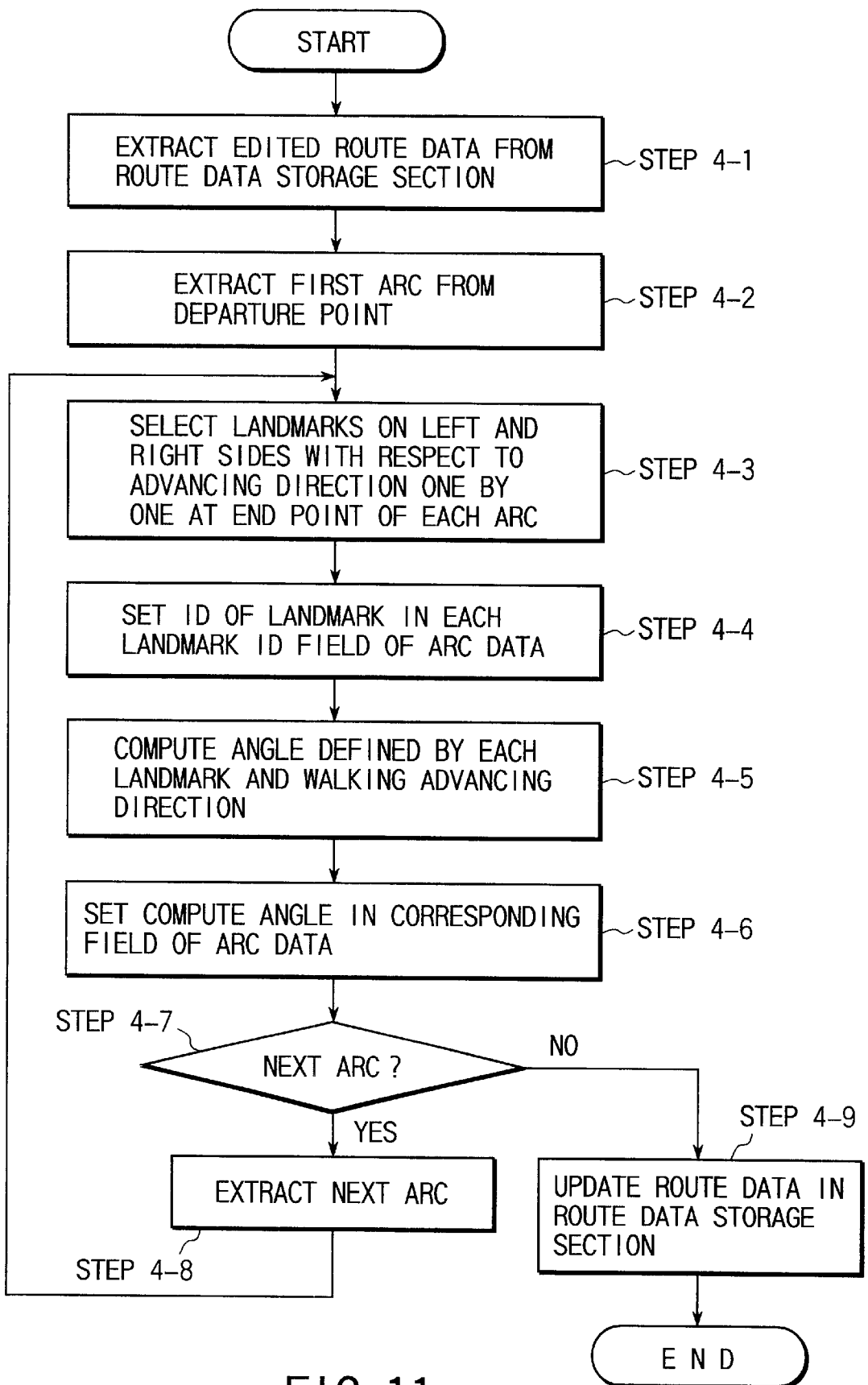
FIG. 11 is a flow chart showing the first procedure for landmark selection processing.

Landmark selection is performed according to the procedure shown in FIG. 11. First of all, the route data edited in step 3 is extracted from the route data storage section 16 (step 4-1).

The first arc with respect to the departure point is extracted from the route data (step 4-2).

At the end point of each extracted arc, a pair of landmarks located on the left and right sides in the advancing direction of the arc are selected (step 4-3). A method of selecting landmarks at each point will be described later.

The IDs of the landmarks selected in step 4-3 are set as the end-point left-side landmark ID and end point right-side landmark ID of the arc data (step 4-4).

The angles defined by these landmarks with respect to the advancing direction are calculated (step 4-5) and set as the end-point left-side landmark angle and end-point right-side landmark angle of the arc data (step 4-6).

It is then checked whether any arc exists following the currently processed arc (step 4-7). If such an arc exists, the flow returns to step 4-3 to continue the processing. Otherwise, the flow advances to the next step.

Lastly, the route data in the route guide text storage section is replaced with the route data having undergone the above processing (step 4-8). In the above manner, the processing in the landmark selector section 17 is executed.

The processing in step 4-3 in the landmark selector section 17 will be described next.

Figure 12:
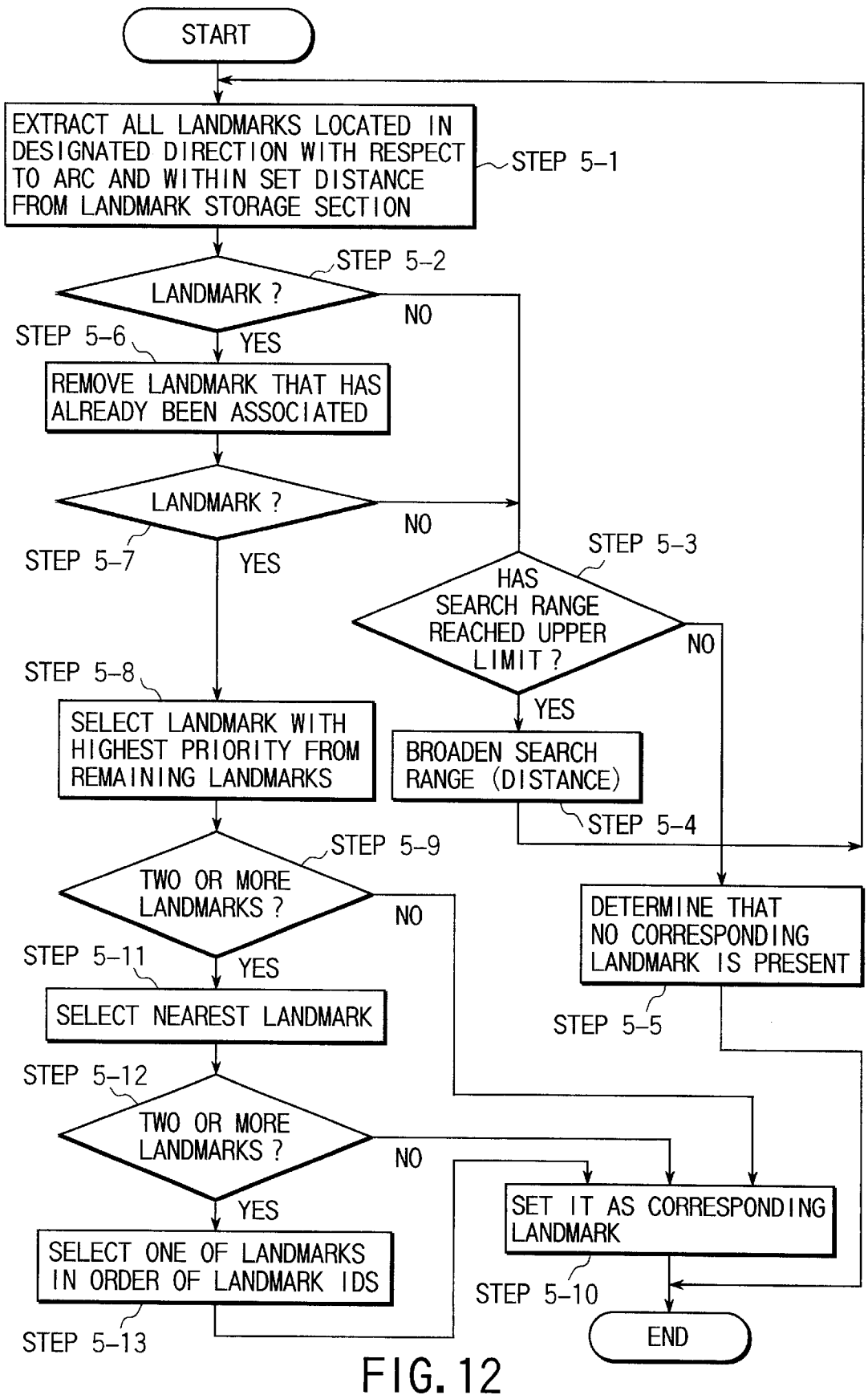
FIG. 12 is a flow chart showing the second procedure for landmark selection processing.

In step 4-3, processing is executed according to the procedure shown in FIG. 12. First of all, all landmarks located in a designated direction with respect to a target arc and within a predetermined distance from each point are extracted from the landmark storage section 13 (step 5-1).

It is then checked whether any landmarks are extracted (step 5-2). If landmarks are extracted, the flow advances to the next step. Otherwise, it is checked whether the search range has reached a predetermined upper limit (step 5-3). If the range has not reached the upper limit, the search range is broadened (step 5-4), and the flow returns to step 5-1. If the range has reached the upper limit, it is determined that no landmark is present, and the processing is terminated (step 5-5).

Any landmarks that have already been associated with other points are removed from the selected landmarks (step 5-6). It is then checked whether any of the selected landmarks is left (step 5-7). If any landmark is left, the flow advances to the next step. Otherwise, it is checked whether the search range has reached the predetermined upper limit (step 5-3). If the range has not reached the upper limit, the search range is broadened (step 5-4), and the flow returns to step 5-1. If the range has reached the upper limit, it is determined that no corresponding landmark is left, and the processing is terminated (step 5-5).

Subsequently, one or a plurality of landmarks with the highest priority are selected from the remaining landmarks (step 5-8). It is then checked whether a plurality of landmarks are selected (step 5-9). If a plurality of landmarks are not selected, i.e., only one landmark is obtained, this landmark is regarded as a corresponding landmark, and the processing is terminated (step 5-10). If a plurality of landmarks are selected, the nearest landmark or landmarks are selected from them (step 5-11).

It is then checked whether a plurality of landmarks are selected (step 5-12). If only one landmark is selected, this landmark is regarded as a corresponding landmark, and the processing in step 5-10 is terminated. If there are a plurality of landmarks with the same distance, these landmarks are narrowed down to only one landmark in the order of landmark IDs (step 5-13). As a method of narrowing down landmarks, for example, a method of selecting a landmark with the largest ID number may be used. In the above manner, the processing in step 4-3 in the landmark selector section 17 is executed.

Route guide text generating processing (step 5) in the route guide text generator section 18 will be described next. Two schemes can be used to generate route guide texts. One scheme is to designate distances from landmarks as guides in the following manner:

1. Turn right at the ΔΔ crossing 100 m ahead where the ○○ bank is located on the right side and the □□ store is located on the left side, and go ahead 50 m.

2. Turn left at the corner where the XX bookstore is located on the right side and the 12-story building is located on the left side, and go ahead 200 m along the ΔΔ street.

3. Turn left, then you will find the destination.

The other scheme is to designate distances to landmarks as guides. The above guide text is expressed by this scheme as follows:

1. Go ahead 100 m, and turn right at the ΔΔ crossing where the ○○ bank is located on the right side and the □□ store is located on the left side.

2. Go ahead 50 m, and turn left at the corner where the XX bookstore is located on the right side and the 12-story building is located on the left side.

3. Go ahead 200 m along the ΔΔ street, and turn left. Then, you will find the destination.

Figure 13A:
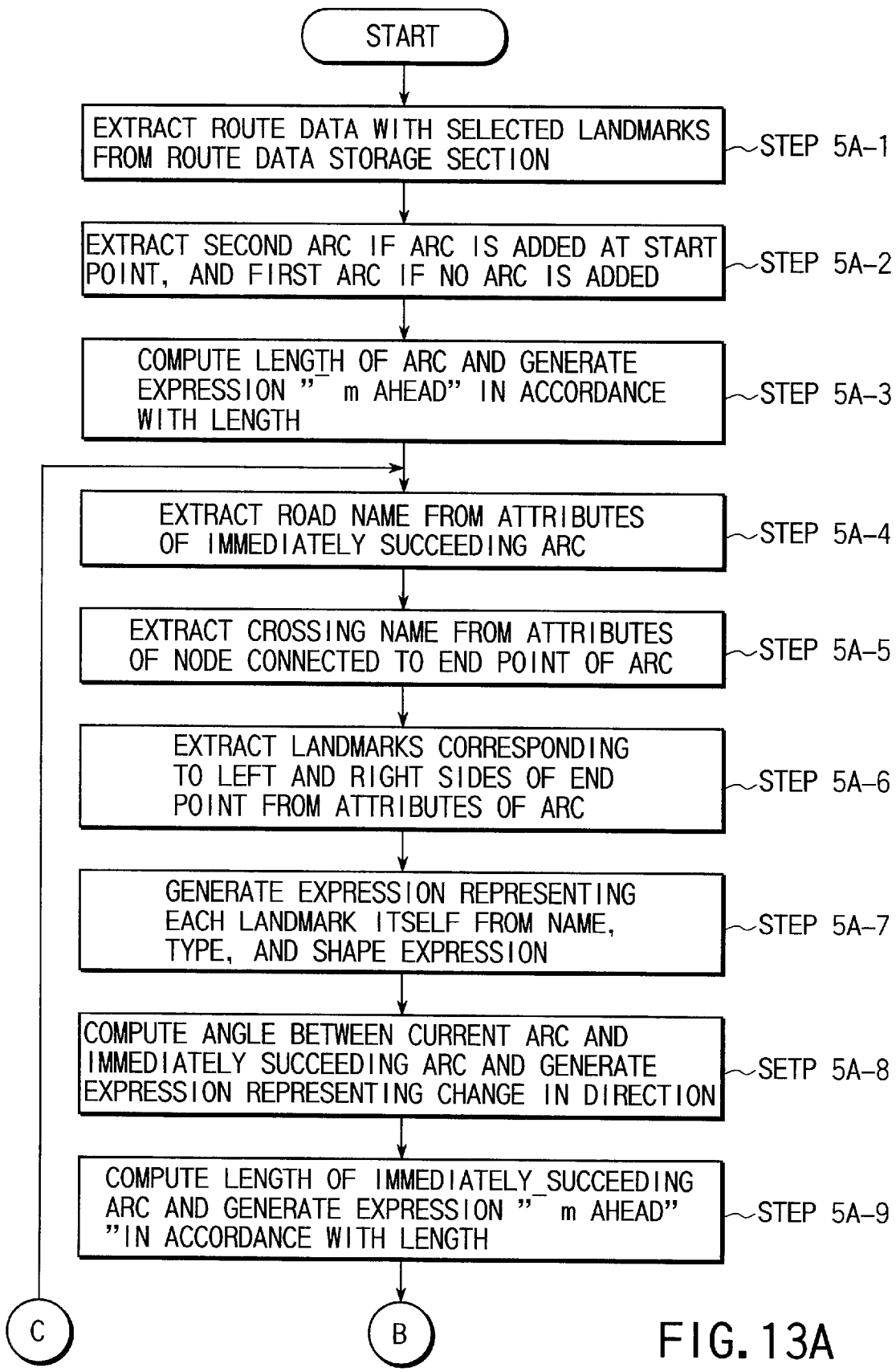
FIGS. 13A and 13B are flow charts showing procedure A for generating a route guide text.
Figure 13B:
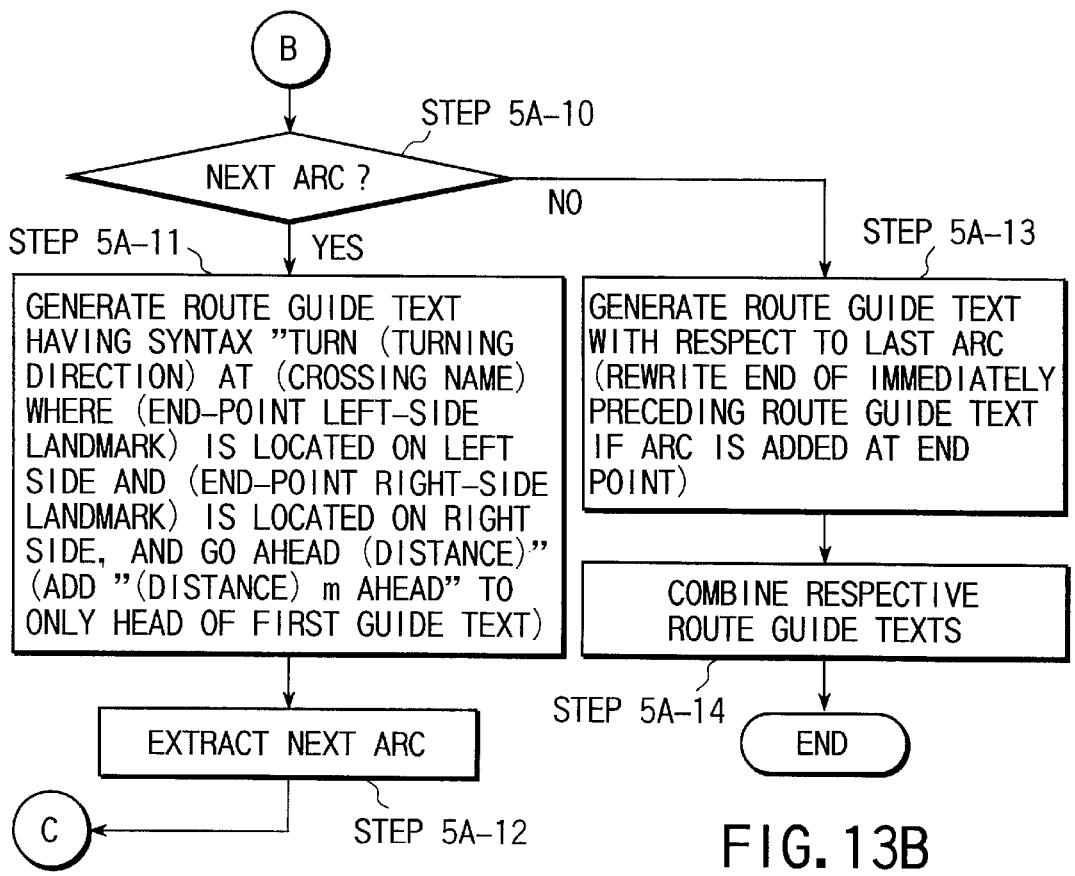

The former will be referred to as type A; and the latter, type B. Procedures for generating the respective types of guide texts will be described below. The method of generating a route guide text of type A will be described first with reference to FIGS. 13A and 13B.

First of all, the route data with the landmarks selected in step 4 is extracted from the route data storage section 16 (step 5A-1).

If an arc is added at the departure point, the second arc from the departure point is extracted from the route data; otherwise, the first arc from the departure point is extracted from the route data (step 5A-2).

In step 5A-2, the length of the extracted arc is computed, and the expression "go ahead ~m" is generated in accordance with the computed length (step 5A-3). In this case, the computed value is rounded off to an appropriate unit. For example, the expression "go ahead 138 m" is modified into the expression "go ahead 150 m", and the expression "go ahead 270 m" is modified into "go ahead 300 m". In addition, as the distance decreases, a larger unit is set, and vice versa. For example, the distances are rounded off to 10 m, 20 m, 30 m, 50 m, 100 m, 200 m, 300 m, 500 m, 1 km, . . . when they are expressed. Note that a distance can be expressed like "go ahead for ○○ minutes on foot" as indicated by "(8-4)" in FIG. 9 as well as being displayed in meters. In addition, a distance may be expressed like "go ahead ○○ steps" using the number of steps as indicated by "(8-5)". A road name is extracted from the attributes of the arc immediately succeeding the arc extracted in step 5A-2 (step 5A-4).

A crossing name is then extracted from the attributes of the arc connected to the end point of the arc extracted in step 5A-2 (step 5A-5). Landmarks corresponding to the left and right sides of the end point are extracted from the attributes of the arc extracted in step 5A-2 (step 5A-6). Expressions indicating these landmarks are generated from "name", "type", and "shape expression" (step 5A-7). In this case, if "shape expression" is set, this expression is used. If "shape expression" is not set, a default shape expression (c) in FIG. 7 is checked from "type" and used. If no default shape expression is set, "name" is used. Even if an expression based on "shape expression" or a default shape expression is used, "name" can also be used without posing any problem. For example, the expression "large white building (○×building)" or "12-story condominium (cooperative house ××)" can be used.

The angle between the arc extracted in step 5A-2 and the immediately succeeding arc is computed to check a specific side to which the route curves, and generate an expression representing a change in direction (step 5A-8). The expression is changed in accordance with the angle. Assume that the route curves to the right. In this case, if the angle with respect to the walking direction is 0° to 10°, the expression "go straight" is generated. The expression is changed to "go ahead along the road" for 10° to 30°, "turn right slightly" for 30° to 60°, "turn right" for 60° to 120°, and "turn right greatly" for 120° or more.

The length of the arc immediately succeeding the arc extracted in step 5A-2 is computed, and the expression "go ahead ~m" is generated in accordance with the computed length (step 5A-9). In this case, the length is expressed after being rounded off to an appropriate unit as in step 5A-3.

It is then checked whether there is any arc for which a route guide text should be generated (step 5A-10). The arc for which a route guide text should be generated indicates the arc immediately preceding the last arc of the route if an arc is added at the end point portion, i.e., the end point portion is spaced apart from the road, and indicates the last arc of the route if no arc is added, i.e., the end point portion is located on the road or at a position where it can be regarded to be located on the road.

If there is an arc for which a route guide text should be generated, the flow advances to step 5A-11. Otherwise, the flow advances to step 5A-13. In step 5A-11, a guide text having the syntax "Turn (an expression representing the direction in which the user turns) at the crossing point where (a landmark on the left side of the end point) is located on the left side and (a landmark on the right side of the end point) is located on the right side, and go ahead (the distance to the next point) along (road name)" is generated by combining the road name obtained in step 5A-4, the crossing name obtained in step 5A-5, the expressions of landmarks obtained in step 5A-7, the expression representing the direction obtained in step 5A-8, and the expression representing the distance obtained in step 5A-9. For example, the guide text "Turn left at the ΔΔ crossing where the supermarket ○○ is located on the left side and the 10-story condominium is located on the right side, and go ahead 100 m along the ○Δ street" is generated. Note that the expression "(distance) ahead" is added to only the head of the first guide text by using the character string representing the distance obtained in step 5A-3. If a given item has no value, for example, no road name is assigned, a guide text is generated with an omission of the corresponding expression.

The next arc is then extracted, and the flow returns to step 5A-4 to continue the above processing.

In step 5A-13, if a node is added at the end point portion, a guide text having the syntax "Turn (an expression indicating the direction in which the user turns), then you will find the destination" is generated by using the expression representing the direction obtained in step 5A-8. For example, the guide text "Turn right, then you will find the destination". If no node is added, the expression "Then, you will find the destination" is added to the end of the guide text generated for the immediately preceding arc. If, for example, the guide text for the immediately preceding is "Turn left at the ΔΔ crossing where the supermarket ○○ is located on the left side and the 10-story condominium is located on the right side, and go ahead 100 m along the ○Δ street", this guide text is replaced with the guide text "Turn left at the ΔΔ crossing where the supermarket ○○ is located on the left side and the 10-story condominium is located on the right side, and go ahead 100 m along the ○Δ street. Then, you will find the destination".

Finally, the route guide texts generated for the respective arcs are combined into one and stored in the route guide text storage section 19 (step 5A-14). In this manner, a route guide text of type A is generated.

Figure 14B:
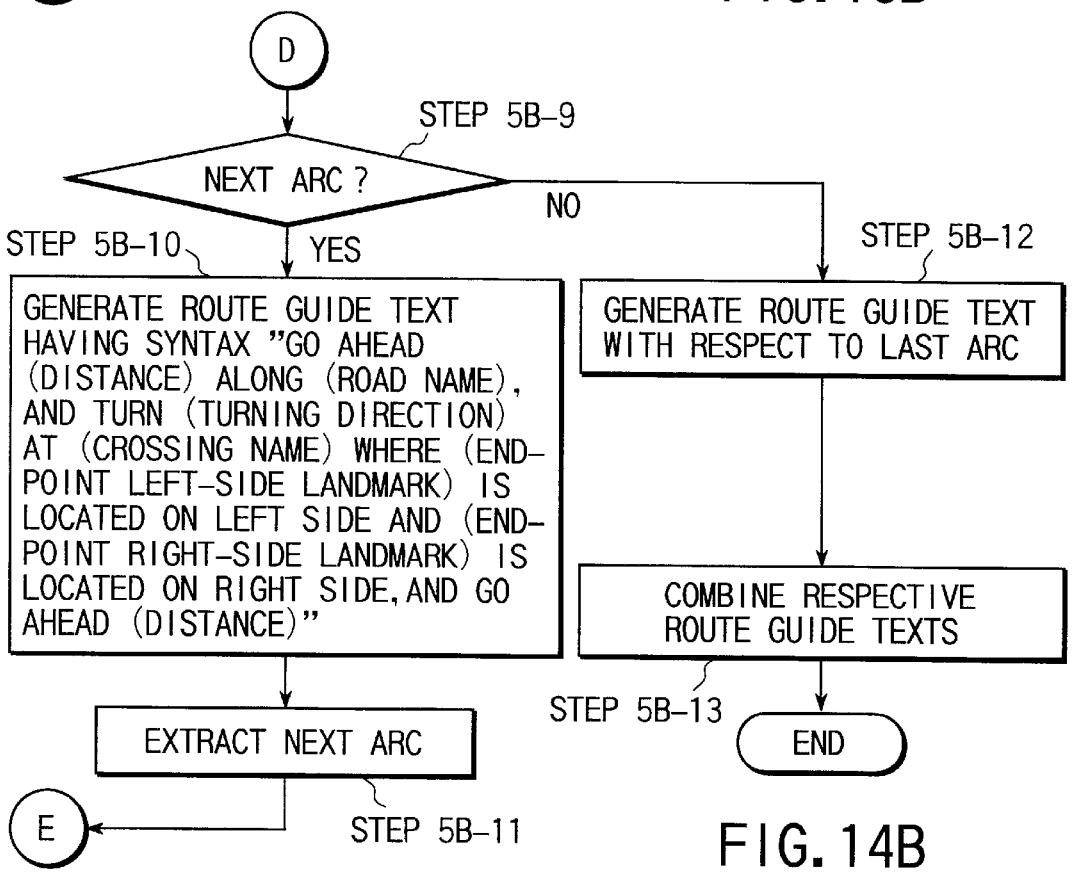
FIGS. 14A and 14B are flow charts showing procedure B for generating a route guide text.
Figure 14A:
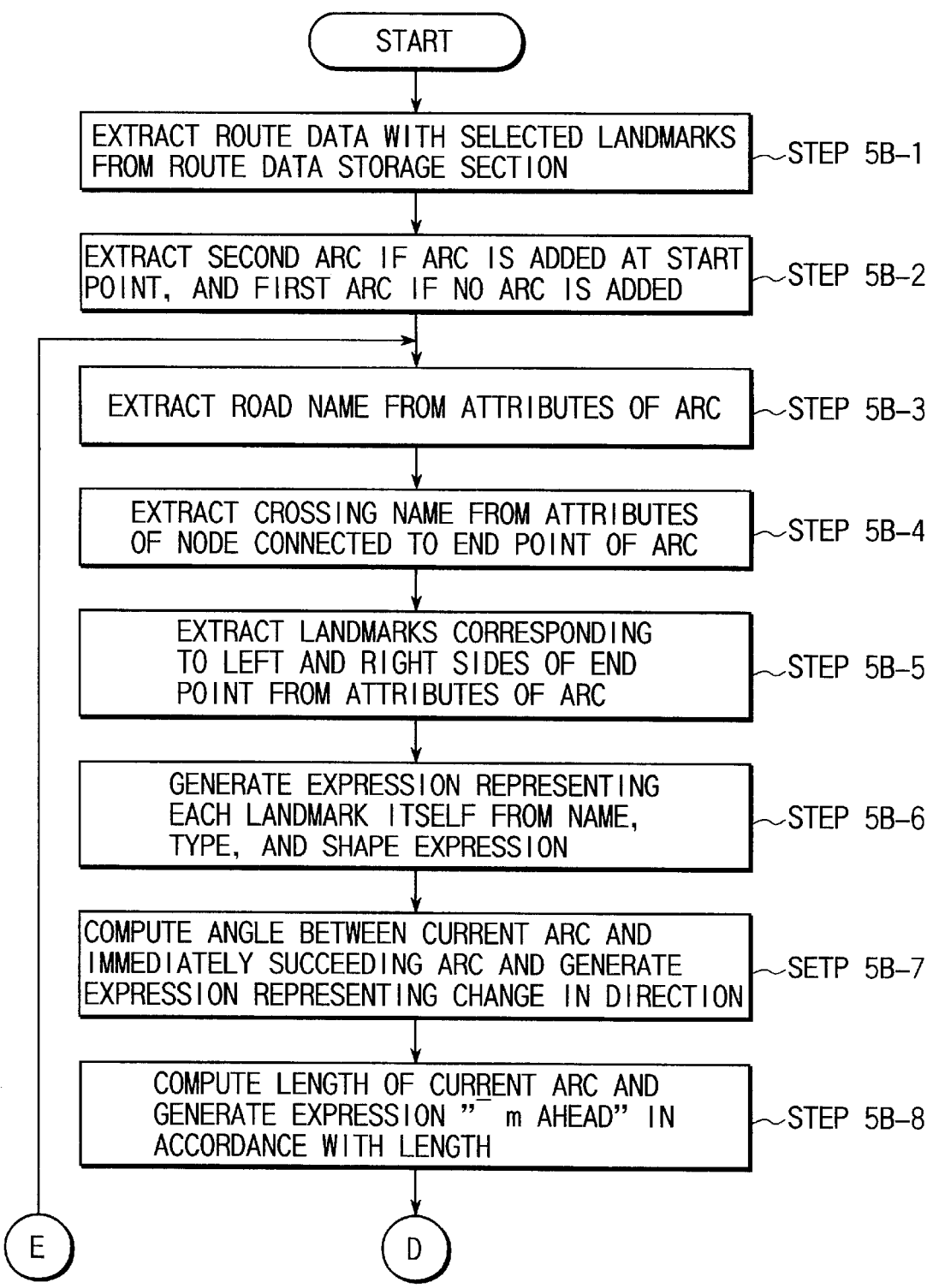

The method of generating a route guide text of type B will be described next with reference to FIGS. 14A and 14B.

First of all, the route data with the landmarks selected in step 4 is extracted from the route data storage section 16 (step 5B-1). If an arc is added at the departure point, the second arc from the departure point is extracted from the route data; otherwise, the first arc from the departure point is extracted from the route data (step 5B-2). A road name is extracted from the attributes of this arc (step 5B-3).

A crossing name is extracted from the attributes of the node connected to the end point of the arc (step 5B-4). Landmarks corresponding to the left and right sides of the end point are extracted from the attributes of the arc (step 5B-5). Expressions representing these landmarks themselves are generated from "name", "type", and "shape expression" (step 5B-6). Note that these expressions are generated by the same method as in the case of type A.

The angle between the current arc and the immediately succeeding arc is computed to check the specific direction in which the route curves, and an expression representing a change in direction is generated (step 5B-7). At this time, the expression is changed in accordance with the angle as in the case of type A.

The length of the arc is computed, and the expression "~m ahead" is generated in accordance with the computed length (step 5B-8). In this case, the length is expressed after being rounded off to an appropriate unit as in the case of type A. In addition, as the distance decreases, a smaller unit is set to round off the value, and vice versa. Note that a distance can be expressed like "go ahead for ○○ minute on foot" as well as being displayed in meters. In addition, a distance may be expressed like "go ahead ○○ steps" using the number of steps.

It is then checked whether there is any arc for which a route guide text should be generated (step 5B-9). As in the case of type A, the arc for which a route guide text should be generated indicates the arc immediately preceding the last arc of the route if an arc is added at the end point portion, i.e., the end point portion is spaced apart from the road, and indicates the last arc of the route if no arc is added, i.e., the end point portion is located on the road or at a position where it can be considered to be located on the road.

If there is an arc for which a route guide text should be generated, the flow advances to step 5B-10. Otherwise, the flow advances to step 5B-12.

In step 5B-10, a guide text having the syntax "Go ahead (a distance) along (a road name), and turn (an expression representing the direction in which the user turns) at (a crossing name) where (a landmark on the left side of the end point) is located on the left side and (a landmark on the right side of the end point) is located on the right side" is generated by combining the road name obtained in step 5B-3, the crossing name obtained in step 5B-4, the expressions of landmarks obtained in step 5B-6, the expression representing the direction obtained in step 5B-7, and the expression representing the distance obtained in step 5B-8. For example, the guide text "Go ahead 150 m along the ○○ street, and turn right at the △△ crossing where a large bookstore is located on the left and the supermarket ○○ is located on the right side" is generated. If a given item has no value, for example, no road name is assigned, a guide text is generated with an omission of the corresponding expression.

Subsequently, the next arc is extracted, and the flow returns to step 5B-3 to continue the above processing. In step 5B-12, if a node is added at the end point portion, a guide text having the syntax "Go ahead (a distance) along (a road name), and turn (an expression representing the direction in which the user turns). Then, you will find the destination" is generated by using the road name obtained in step 5B-3 and the expression representing the direction obtained in step 5B-7. For example, the guide text "Go ahead 50 m along the ○○ street, and turn left. Then, you will find the destination" is generated. If a given item has no value, for example, no road name is assigned, a guide text is generated with an omission of the corresponding expression.

Finally, the route guide texts generated for the respective arcs are combined into one and stored in the route guide text storage section 19 (step 5B-13).

A route guide text of type B is generated in this manner. Such route guide text generating processing is executed by the route guide text generator section 18.

(Second Embodiment)

Figures 15, 16:
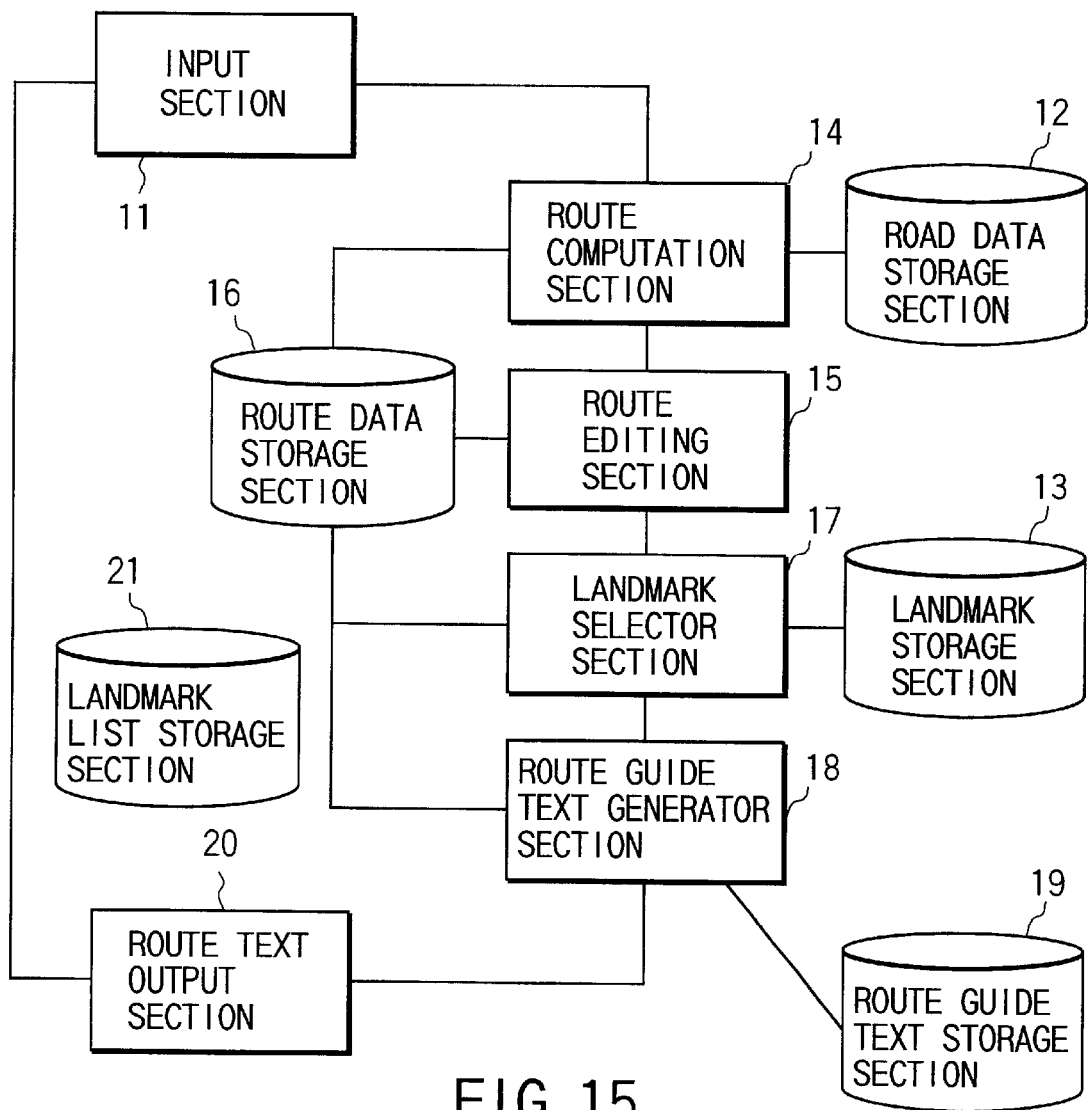
FIG. 15 is a block diagram showing the schematic arrangement of an apparatus for automatically generating a pedestrian route guide text according to the second embodiment.
FIG. 16 is a view showing the structure of a landmark list.

FIG. 15 shows the schematic arrangement of the second embodiment. The second embodiment has a landmark list storage section 21 in addition to the components of the first embodiment to sequentially manage the landmarks obtained by a landmark selector section 17 in the form of a list structure, starting from the first landmark candidate. In addition, by changing the item of each landmark ID of route data into that of each landmark list ID, second and third landmarks can be extracted, as well as the first candidate, by tracing the list. In addition, the user can operate a route text output section 20 with an input section 11 to call the second and third landmarks on the basis of the result output to the route text output section 20.

FIG. 16 shows the structure of the landmark list. The landmark count represents the number of landmarks registered in the list. Landmark 1 to landmark N represent the landmark IDS of the first to Nth landmark candidates. Note that N is equal to the landmark count.

FIG. 17 shows a case wherein the second and third landmark candidates are called and displayed on the basis of the output result. In this case, as subsequent candidates for "Jouge Bookstore" selected as the first candidate, three candidates, namely 'condominium "2222"', "Sayu store", and "Suzuki Dental Clinic", are displayed. When a landmark name or a character string representing it on the text is clicked, the names of second and subsequent landmark candidates are displayed on the pull-down menu. In this case, detailed information may be displayed by selecting a corresponding name. Alternatively, a landmark portion may be set as a hyperlink for a Web page. When this portion is clicked, the portion is replaced with the next character string or the entire text containing the landmark may be replaced with a text using a new landmark.

In the above embodiment, as route data and landmark information, route data and landmark information stored in the route data storage section and landmark storage section 13 are used. However, such information may be extracted from an external server through a communication line.

(Third Embodiment)

Figure 18:
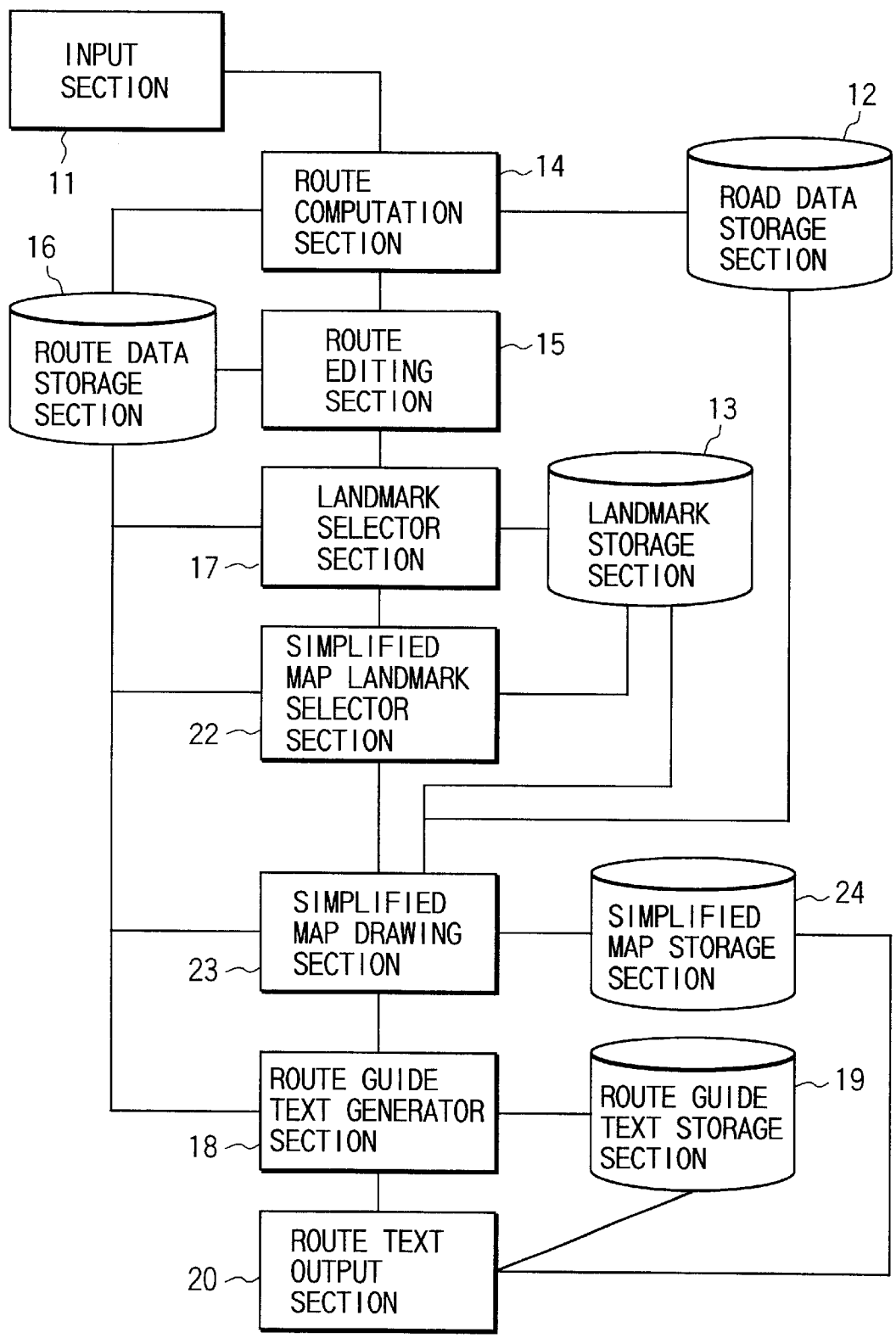
FIG. 18 is a block diagram showing the schematic arrangement of an apparatus for automatically generating a pedestrian route guide text according to the third embodiment.

An apparatus for automatically generating pedestrian route guide texts according to the third embodiment will be described with reference to FIG. 18, which presents a simplified map including a route concurrently with a route guide text generated in the first embodiment and also presents landmarks appearing in the route guide text in the-simplified map.

Figure 19:
FIG. 19 is a view showing the structure of an arc.

According to the third embodiment, a simplified map landmark selector section 22, simplified map drawing section 23, and simplified map storage section 24 are added to the apparatus for automatically generating pedestrian route guide texts according to the first embodiment. As shown in FIG. 19, two new items, an end-point left-side landmark simplified map display ID and end-point right-side landmark simplified map display ID, are added to the arcs of route data. In addition, the operations of the route guide text generator section 18 and route text output section 20 are partly modified.

Figure 20:
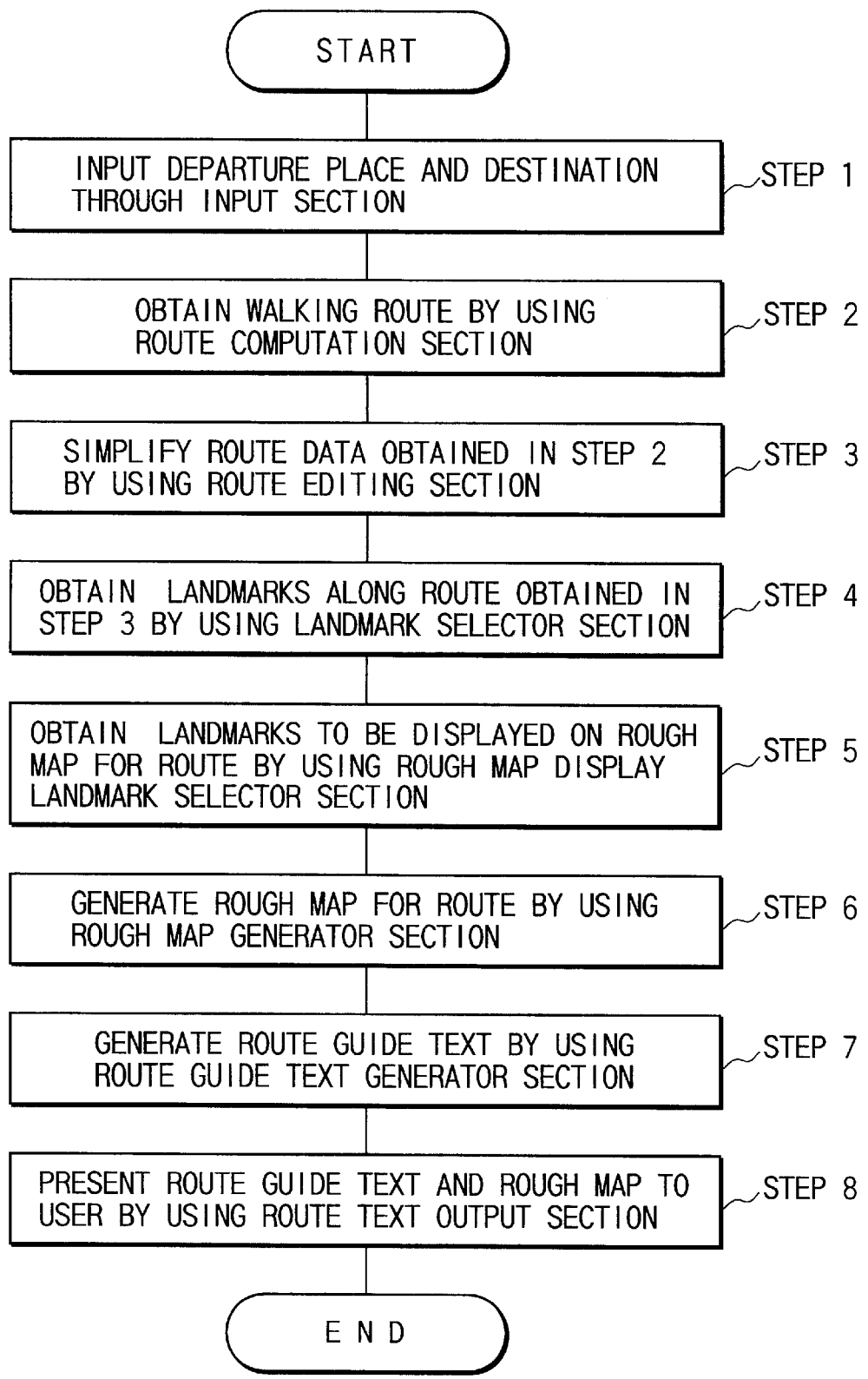
FIG. 20 is a flow chart showing the processing performed by the apparatus for automatically generating a pedestrian route guide text according to the third embodiment.

The operation of the apparatus for automatically generating pedestrian route guide texts shown in FIG. 19 will be described with reference to FIG. 20.

The operation from step 1 to step 4 is the same as that of the apparatus for automatically generating pedestrian route guide texts according to the first embodiment. First of all, the user inputs a departure and destination through an input section 11 (step 1). A route computation section 14 then obtains a pedestrian route (step 2). A route editing section 15 simplifies the route obtained in step 2 (step 3). The landmark selector section 17 obtains landmarks along the route obtained in step 3 (step 4).

The processing in step 5 and the subsequent steps differs from that in the apparatus for automatically generating pedestrian route guide texts according to the first embodiment. In step 5, the simplified map landmark selector section 22 selects landmarks smaller in number than a predetermined upper limit from the landmarks obtained in step 4. At this time, to proportionally select landmarks from the respective points on the route, one landmark with a high priority is selected from left and right landmarks for each arc, and landmarks are selected from the selected landmarks in the order of priority.

In addition, the priorities of landmarks at arcs located before and after a selected landmark are decreased to prevent landmarks from concentrating on the same place. Note that if a sufficient upper limit margin is set, these processes need not be performed. After the selection, ID numbers, 1, 2, ..., are added to portions corresponding to the end-point left-side landmark simplified map display ID and end-point right-side landmark simplified map display ID of each arc of the route data in the order in which they appear on the route. Note that "0" or negative values are added to portions corresponding to landmarks that are not selected by the simplified map landmark selector section 22.

Note that the above upper limit is a value indicating an appropriate amount of data to be displayed at once on the screen in consideration of the display size of a simplified map and the like. This value may dynamically change depending on the state of presentation. For example, the value can be decreased as the resolution of the screen decreases, and vice versa.

Subsequently, the simplified map drawing section 23 generates a simplified map on the basis of the route obtained in step 2 and the landmarks obtained in step 5 (step 6). Assume that ID numbers are displayed at the places where the landmarks are present. The ID numbers need not be numerals and may be "(a), (b), (c)", "(i), (ii), (iii)", "あ, い, う", or "イ, ロ, ハ". A method of generating a simplified map is not specifically limited. The generated map is stored in the simplified map storage section 24.

The route guide text generator section 18 generates a route guide text (step 7). The route guide text is generated by the same method as that in the apparatus for automatically generating pedestrian route guide texts according to the first embodiment. For the landmarks obtained in step 5, the above ID numbers are written in addition to the landmark names written on the simplified map like "[1] Maicho Bank" and "[2] Daiichi Store". If "(a)" and "(b)" are displayed on the simplified map, ID numbers are written like "(a) Maicho Bank" and "(b) Daiichi Store". Note that the above IDs may be written after the names like "Maicho Bank [1]" and "Daiichi Store [2]". The generated route guide text is stored in the route guide text storage section 19.

Lastly, the route text output section 20 acquires the simplified map generated in step 6 and the route guide text generated in step 7 from the simplified map storage section 24 and route guide text storage section 19, respectively, and presents them together. That is, as shown in FIG. 21, the route text output section 20 presents (displays or prints) a simplified map with ID numbers being assigned to landmarks from the departure point to the destination point, together with landmark names.

In the above manner, the apparatus for automatically generating pedestrian route guide texts according to the third embodiment presents route guide texts and a simplified map.

(Fourth Embodiment)

An apparatus for automatically generating pedestrian route guide texts according to the fourth embodiment will be described, which can control the route text output section 20 in the first embodiment by using the input section 11, and a portion of a route guide text presented by the route text output section 20 which corresponds to a place where a user has already walked can be deleted.

Figure 22:
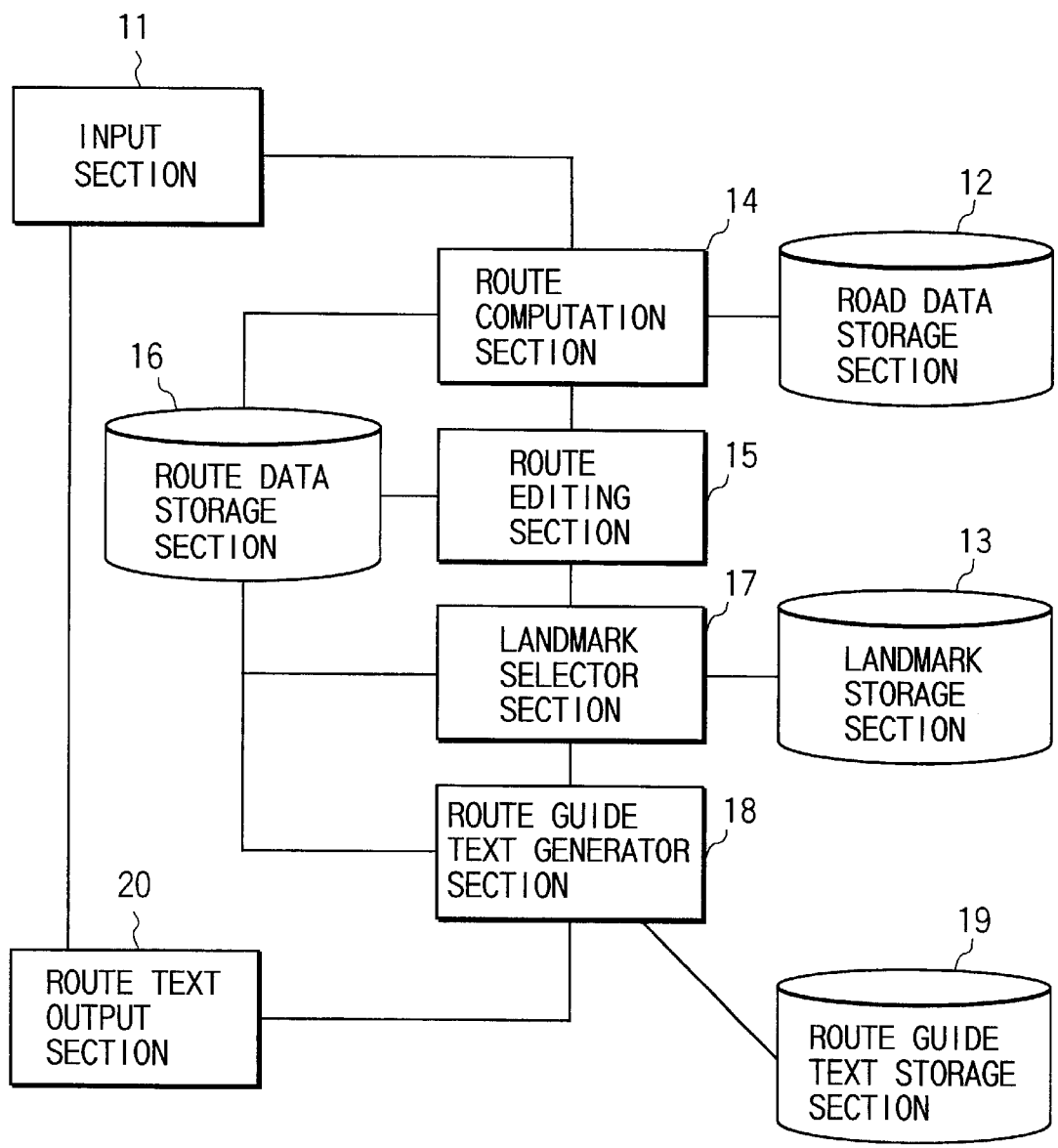
FIG. 22 is a block diagram showing the schematic arrangement of an apparatus for automatically generating a pedestrian route guide text according to the fourth embodiment.
Figure 23:
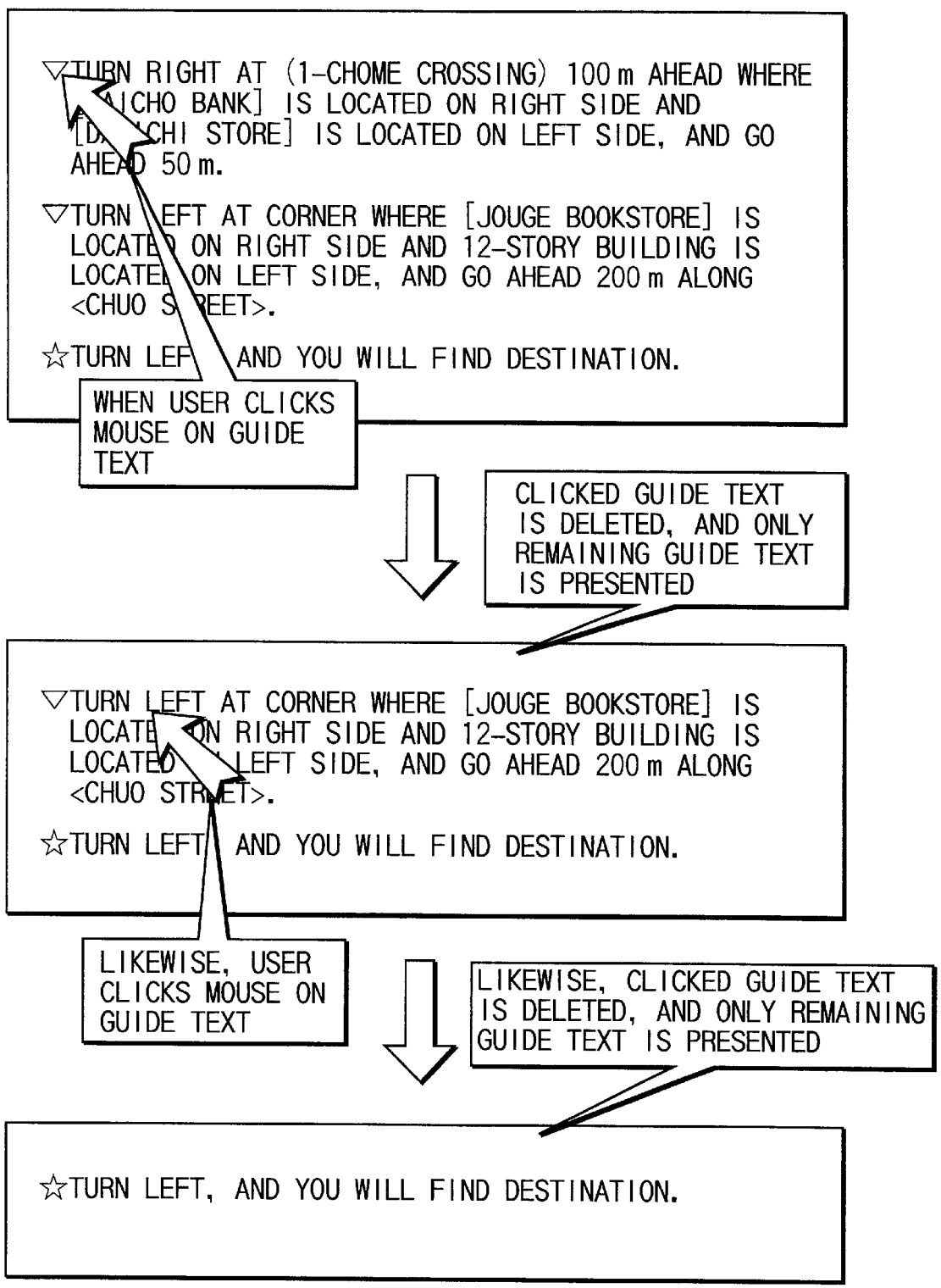
FIG. 23 is a view showing the first example of how a route guide text is presented by the apparatus for automatically generating a pedestrian route guide text according to the fourth embodiment.

This embodiment is comprised of the same constituent elements as those of the first embodiment. In this embodiment, however, an input section 11 is coupled to a route text output section 20 to allow the user to control the route text output section 20, as shown in FIG. 22. With this arrangement, the user can delete a portion of a guide text which corresponds to a place where the user has already walked by designating the portion present on the route text output section 20 by using a pointing device such as a mouse as the input section 11, as shown in FIG. 23. That is, a portion to be deleted can be deleted by instructing deletion by clicking the portion to be deleted with the mouse.

Figure 24:
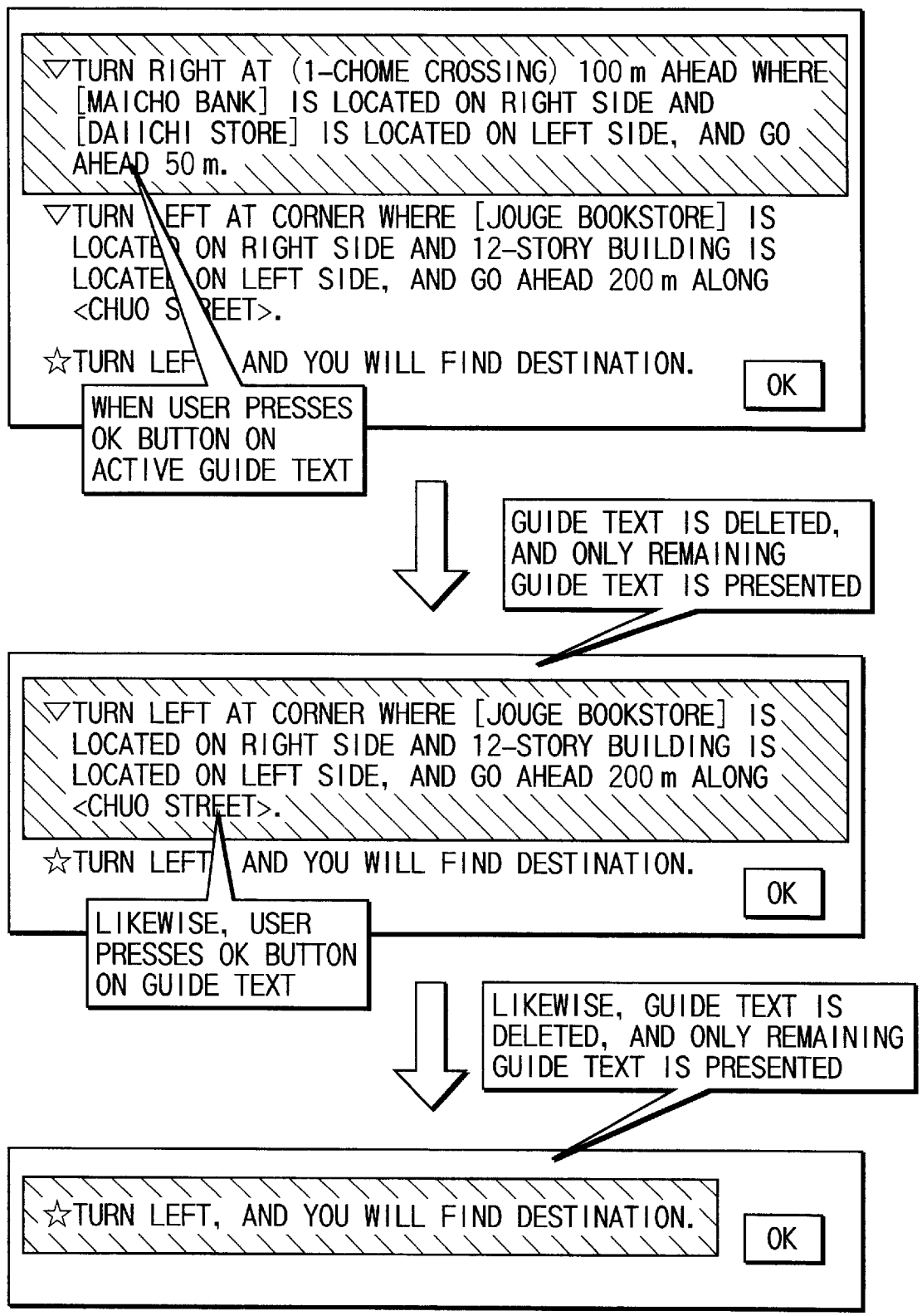
FIG. 24 is a view showing the second example of how a route guide text is presented by the apparatus for automatically generating a pedestrian route guide text according to the fourth embodiment.

In addition, as indicated by an example of presentation shown in FIG. 24, a portion of a guide text which is currently used is made noticeable by changing its color or underlining it, the portion whose color is changed or which is underlined is designated with an arrow key or the like, and the confirmation key is depressed, thereby deleting the portion to be deleted. With this operation, a portion corresponding to a place where the user has already walked can be easily deleted.

In each of the above two cases, the user can delete such portions by himself/herself. However, the current position may be measured by an external sensor based on a GPS, PHS, Bluetooth, or the like, and a portion of a guide text which corresponds to a place where the user has already walked may be automatically selected or deleted from the measurement result.

According to the first embodiment of the present invention, by editing a search route, noise line segments on a road network which cause guidance errors are removed to reduce the influences of noise line segments, and a route guide text that is simple and easy to understand can be generated. In addition, information indicating how landmark information is expressed when it is used for route guidance is added to each landmark information to switch the expression methods depending on the landmarks, thereby generating a route guide text that is easy for a pedestrian to understand.

According to the second embodiment of the present invention, by linking next and subsequent landmarks to each selected landmark, the user can freely call these landmarks afterward. Even if, therefore, the user cannot find the first landmark, he/she can call another nearby landmark to check the route. This makes it possible to reliably guide the user.

According to the third embodiment of the invention, by presenting both a route guide text and a simplified map associated with the route guide text, the user can enjoy the merits of the respective types of expressions. This makes it possible to accurately and reliably guide the user as compared with a case wherein a text and map are separately presented.

According to the fourth embodiment, by deleting a portion of a presented route guide text which corresponds to a place where the user has already walked, only a portion necessary for route guidance can be presented, thus making the route guide text easy to understand.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus for automatically generating a pedestrian route guide text, comprising:

an input section which inputs a departure place and destination;

a route data generator section which outputs route data;

a landmark information generator section which outputs a landmark serving as a guide for a pedestrian and information associated with an expression form of the landmark;

a route computation section which computes a route from the departure place to the destination, which are input through said input section, on the basis of route data obtained from said route data generator section;

a route editing section which edits the route to remove a noise element that causes a guidance error from the route obtained by said route computation section;

a landmark selector section which selects a landmark at each point on the route on the basis of the route obtained by said route editing section;

a route guide text generator section which generates a route guide text on the basis of the route obtained by said route editing section and landmark information selected by said landmark selector section; and a route text output section which presents the route guide text generated by said route guide text generator section.

2. An apparatus according to claim 1, wherein said landmark selector section extracts a landmark within a predetermined distance range, and said route text output section, when a plurality of landmarks are extracted, presents at least one of the extracted landmarks.

3. An apparatus according to claim 1, wherein said route text output section presents the route guide text by means of at least one of presentation using a landmark name and presentation using an expression representing a characteristic feature.

4. An apparatus according to claim 1, wherein when a straight path on said route exceeds a predetermined length, said landmark selector section selects a landmark midway along the straight path.

5. An apparatus according to claim 1, wherein said route guide text generator section generates a guide text by expressing a distance from a given point to a next point on a route using at least one of expressions of an absolute distance, a necessary time, and the number of necessary steps.

6. An apparatus according to claim 1, wherein said route guide text generator section expresses a distance or walking direction from a given point to a next point on a route upon rounding off within a range in which a pedestrian is not misled.

7. An apparatus according to claim 1, wherein said route guide text generator section emphasizes and presents a landmark name.

8. An apparatus according to claim 1, wherein said route guide text generator section presents a type of landmark with an icon being attached thereto.

9. An apparatus according to claim 1, wherein said route guide text generator section presents a route guide text upon deleting a portion thereof which corresponds to a place where the pedestrian has already walked.

10. A method of automatically generating a pedestrian route guide text, comprising the steps of:

setting a departure place and a destination;

preparing route data;

computing a route from the set departure place to the set destination using the route data;

editing the route to remove a noise element that causes a guidance error from the route obtained in the computing step;

selecting a landmark at each point on the route using the edited route;

generating route guide text based on the edited route and selected landmark(s); and presenting the generated route guide text.

11. The method according to claim 10, wherein said landmark selecting step extracts a landmark within a predetermined distance range, and when a plurality of landmarks are extracted in the landmark selecting step, said route text generating step presents at least one of the extracted landmarks.

12. The method according to claim 10, wherein said route text generating step presents the route guide text by means of at least one of presentation using a landmark name and presentation using an expression representing a characteristic feature.

13. The method according to claim 10, wherein when a straight path on said route exceeds a predetermined length, said selecting step selects a landmark midway along the straight path.

14. The method according to claim 10, wherein said route guide text generating step generates a guide text by expressing a distance from a given point to a next point on a route using at least one of expressions of an absolute distance, a necessary time, and the number of necessary steps.

15. The method according to claim 10, wherein said route guide text generating step expresses a distance or walking direction from a given point to a next point on a route upon rounding off within a range in which a pedestrian is not misled.

16. The method according to claim 10, wherein said route guide text generating step emphasizes and presents a landmark name.

17. The method according to claim 10, wherein said route guide text generating step presents a type of landmark with an icon being attached thereto.

18. The method according to claim 10, wherein said route guide text generating step presents a route guide text upon deleting a portion thereof which corresponds to a place where the pedestrian has already walked.

19. A recording medium storing a program for causing a computer to generate a pedestrian route guide text, said program including:

a command to set a departure place and a destination;

a command to acquire route data;

a command to compute a route from the departure place to the destination on the basis of the route data;

a command to edit the route to remove a noise element that causes a guidance error from the route obtained by the command to compute;

a command to select a landmark at each point on the route using the edited route;

a command to generate route guide text based on the edited route and selected landmark(s); and a command to present the generated route guide text.

20. An apparatus for automatically generating a pedestrian route guide text, comprising:

an input section which inputs a departure place and destination;

a route data storage section which stores route data;

a landmark storage section which stores a landmark serving as a guide and information associated with an expression form of the landmark;

a route computation section which computes a route from the departure place to the destination, which are input through said input section, on the basis of route data stored in said route data storage section;

a route editing section which edits the route to remove a noise element that causes a guidance error from the route obtained by said route computation section;

a landmark selector section which selects a landmark at each point on the route on the basis of the route obtained by said route computation section and said route editing section;

a simplified map display landmark selector section which selects a landmark to be displayed on a simplified map from the selected landmarks;

a simplified map drawing section which generates a simplified map for the route on the basis of the route obtained by said route computation section and the landmark information selected by said simplified map display landmark selector section;

a route guide text generator section which generates a route guide text based on the route obtained by said route computation section and said route editing section and the landmark information selected by said landmark selector section and said simplified map display landmark selector section; and a route text output section which presents the route guide text generated by said route guide text generator section and the simplified map generated by said simplified map drawing section.

21. The apparatus according to claim 20, wherein said simplified map display landmark selector section selects the landmarks from the landmarks, which are located along the route and obtained by said route editing section, in the descending order of priorities of the landmarks.

22. The apparatus according to claim 21, wherein said simplified map display landmark selector section prevents selected landmarks from concentrating on the same place by decreasing a priority of a landmark located near a selected landmark.

23. An apparatus according to claim 20, wherein said route text output section presents a route guide text and simplified map while assigning identical marks to both the route guide text and the simplified map.

* * * * *